(12) United States Patent
Suzuki et al.

(10) Patent No.: US 12,013,040 B2
(45) Date of Patent: Jun. 18, 2024

(54) SLIDING COMPONENTS

(71) Applicant: Eagle Industry Co., Ltd., Tokyo (JP)

(72) Inventors: Hiroshi Suzuki, Tokyo (JP); Tadatsugu Imura, Tokyo (JP); Iwa Ou, Tokyo (JP); Yuichiro Tokunaga, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 311 days.

(21) Appl. No.: 17/429,896

(22) PCT Filed: Feb. 19, 2020

(86) PCT No.: PCT/JP2020/006421
§ 371 (c)(1),
(2) Date: Aug. 10, 2021

(87) PCT Pub. No.: WO2020/171102
PCT Pub. Date: Aug. 27, 2020

(65) Prior Publication Data
US 2022/0099138 A1 Mar. 31, 2022

(30) Foreign Application Priority Data
Feb. 21, 2019 (JP) .................................. 2019-029626

(51) Int. Cl.
*F16J 15/34* (2006.01)
*F16J 15/3256* (2016.01)
(52) U.S. Cl.
CPC ....... *F16J 15/3424* (2013.01); *F16J 15/3416* (2013.01); *F16J 15/3256* (2013.01)
(58) Field of Classification Search
CPC ..... F16J 15/3412; F16J 15/3416; F16J 15/342
See application file for complete search history.

(56) References Cited

U.S. PATENT DOCUMENTS

| 3,085,808 A | 4/1963 | Williams | 277/388 |
| 3,232,680 A | 2/1966 | Clark | 384/110 |

(Continued)

FOREIGN PATENT DOCUMENTS

| CN | 1364987 | 8/2002 | ............... F16J 15/40 |
| CN | 2534429 | 2/2003 | ............... F16J 15/40 |

(Continued)

OTHER PUBLICATIONS

Chinese Office Action issued in application No. 201980059152.X (with translation), dated May 8, 2023, 11 pages.

(Continued)

*Primary Examiner* — Nicholas L Foster
(74) *Attorney, Agent, or Firm* — HAYES SOLOWAY P.C.

(57) ABSTRACT

A pair of sliding components are disposed at a relatively rotating position at the time of running a rotary machine and formed in an annular shape in which a sealed liquid is present on one side of an inner radial side and an outer radial side and a gas is present on the remaining side thereof. A sliding surface of a sliding component is provided with a dynamic pressure generation groove which communicates with the side of a gas in a radial direction and which is configured to generate a dynamic pressure between the sliding surfaces by the gas at the time of running the rotary machine. A sliding surface of a sliding component is provided with a groove which extends in a circumferential direction.

12 Claims, 12 Drawing Sheets

(56) References Cited

U.S. PATENT DOCUMENTS

| | | | |
|---|---|---|---|
| 3,410,565 A | 11/1968 | Williams | 277/348 |
| 3,466,052 A | 9/1969 | Ludwig | |
| 3,499,653 A | 3/1970 | Gardner | 277/27 |
| 3,527,465 A | 9/1970 | Guinard | 277/27 |
| 3,656,227 A | 4/1972 | Weinand | 29/530 |
| 3,675,935 A * | 7/1972 | Ludwig | F16J 15/342 |
| | | | 277/400 |
| 3,782,737 A * | 1/1974 | Ludwig | F16J 15/342 |
| | | | 277/400 |
| 3,804,424 A | 4/1974 | Gardner | 277/27 |
| 3,855,624 A | 12/1974 | Reinhoudt | F16C 17/045 |
| 3,870,382 A | 3/1975 | Reinhoudt | F16C 17/045 |
| 4,406,466 A | 9/1983 | Geary, Jr. | 277/347 |
| 4,486,026 A | 12/1984 | Furumura et al. | 277/80 |
| 4,523,764 A * | 6/1985 | Albers | F16J 15/342 |
| | | | 277/408 |
| 4,645,414 A * | 2/1987 | DeHart | F04D 17/161 |
| | | | 277/400 |
| 5,092,612 A | 3/1992 | Victor | 277/400 |
| 5,133,562 A * | 7/1992 | Lipschitz | F16J 15/342 |
| | | | 277/408 |
| 5,201,531 A | 4/1993 | Lai | F16J 15/3412 |
| 5,222,743 A | 6/1993 | Goldswain | 277/400 |
| 5,385,409 A | 1/1995 | Ide | F16J 15/3432 |
| 5,441,283 A | 8/1995 | Pecht et al. | 277/96.1 |
| 5,447,316 A | 9/1995 | Matsui | F16J 15/34 |
| 5,492,341 A | 2/1996 | Pecht | 277/400 |
| 5,496,047 A | 3/1996 | Goldswain | F16J 15/3412 |
| 5,498,007 A | 3/1996 | Kulkarni | 277/366 |
| 5,501,470 A | 3/1996 | Fuse | 277/400 |
| 5,529,318 A | 6/1996 | Fuse | F16J 15/3412 |
| 5,556,111 A | 9/1996 | Sedy | 277/96.1 |
| 5,605,339 A | 2/1997 | Pecht | F16J 15/3412 |
| 5,664,787 A | 9/1997 | Fuse et al. | F16J 15/34 |
| 5,702,110 A | 12/1997 | Sedy | |
| 5,895,051 A | 4/1999 | Bowers | B62D 5/22 |
| 6,142,478 A | 11/2000 | Pecht | F16J 15/3484 |
| 6,189,896 B1 | 2/2001 | Dickey et al. | F16L 17/06 |
| 6,446,976 B1 | 9/2002 | Key | 277/367 |
| 6,575,470 B1 | 6/2003 | Gacek | F16J 15/3412 |
| 6,817,766 B2 | 11/2004 | Gomyo | F16C 32/06 |
| 7,044,470 B2 * | 5/2006 | Zheng | F16J 15/342 |
| | | | 277/408 |
| 7,510,330 B2 | 3/2009 | Obara | F16C 32/06 |
| 7,568,839 B2 | 8/2009 | Gotoh et al. | F16C 32/06 |
| 7,744,094 B2 * | 6/2010 | Yanagisawa | F16J 15/342 |
| | | | 277/408 |
| 7,758,051 B2 | 7/2010 | Roberts-Haritonov et al. | |
| | | | F16J 15/34 |
| 7,780,399 B1 | 8/2010 | Garrison | F01D 25/183 |
| 8,162,322 B2 | 4/2012 | Flaherty | F16J 15/3412 |
| 9,062,775 B2 | 6/2015 | Short et al. | F16J 15/34 |
| 9,353,865 B2 | 5/2016 | Lattin | F16N 21/00 |
| 9,353,867 B2 | 5/2016 | Itadani | F16J 15/342 |
| 9,371,912 B2 | 6/2016 | Hosoe et al. | F16J 15/34 |
| 9,587,745 B2 | 3/2017 | Itadani et al. | F16J 15/3412 |
| 9,611,938 B1 * | 4/2017 | Itadani | F16J 15/3416 |
| 9,677,670 B2 | 6/2017 | Itadani et al. | F16J 15/34 |
| 9,829,109 B2 | 11/2017 | Itadani et al. | F16J 15/3412 |
| 9,845,886 B2 | 12/2017 | Itadani | F16C 17/045 |
| 9,951,873 B2 | 4/2018 | Inoue et al. | F16J 15/34 |
| 9,982,784 B2 | 5/2018 | Osada et al. | F16J 15/34 |
| 10,054,230 B2 | 8/2018 | Katori | F16J 15/34 |
| 10,072,759 B2 | 9/2018 | Inoue et al. | F16J 15/34 |
| 10,113,648 B2 | 10/2018 | Inoue et al. | F16J 15/342 |
| 10,190,689 B2 | 1/2019 | Yoshida | F16J 15/3412 |
| 10,337,560 B2 * | 7/2019 | Tokunaga | F16C 33/80 |
| 10,337,620 B2 | 7/2019 | Tokunaga et al. | F16J 15/342 |
| 10,352,450 B2 | 7/2019 | Yamanaka et al. | F16J 15/3204 |
| 10,408,349 B2 | 9/2019 | Miyazaki | F16J 15/3272 |
| 10,473,220 B2 | 11/2019 | Tokunaga et al. | F16J 15/34 |
| 10,487,944 B2 | 11/2019 | Itadani | F16J 15/3496 |
| 10,487,948 B2 | 11/2019 | Inoue et al. | F16J 15/342 |
| 10,495,228 B2 | 12/2019 | Itadani et al. | F16J 15/34 |
| 10,648,569 B2 | 5/2020 | Itadani | F16K 15/34 |
| 10,655,736 B2 | 5/2020 | Itadani | F16J 15/3416 |
| 10,704,417 B2 | 7/2020 | Tokunaga et al. | F01D 25/16 |
| 10,781,924 B2 | 9/2020 | Inoue et al. | F16J 15/342 |
| 10,883,603 B2 | 1/2021 | Inoue et al. | F16J 15/342 |
| 10,883,604 B2 | 1/2021 | Inoue et al. | F16J 15/342 |
| 11,009,072 B2 | 5/2021 | Kimura et al. | F16J 15/34 |
| 11,009,130 B2 | 5/2021 | Itadani | F16J 15/3284 |
| 11,125,335 B2 | 9/2021 | Kimura et al. | F16J 15/34 |
| 11,221,071 B2 | 1/2022 | Sasaki | F16C 17/04 |
| 11,525,512 B2 | 12/2022 | Kimura | F16J 15/3412 |
| 11,530,749 B2 | 12/2022 | Kimura | F16J 15/447 |
| 11,603,934 B2 | 3/2023 | Imura | F16J 15/3412 |
| 11,644,100 B2 | 5/2023 | Kimura | F16J 15/324 |
| 2002/0093141 A1 | 7/2002 | Wang | 277/358 |
| 2003/0178781 A1 | 9/2003 | Tejima | |
| 2004/0080112 A1 | 4/2004 | Tejima | 277/306 |
| 2005/0135714 A1 | 6/2005 | Rahman | F16C 17/107 |
| 2005/0141789 A1 | 6/2005 | Kita et al. | F16C 32/06 |
| 2005/0212217 A1 | 9/2005 | Tejima | 277/399 |
| 2006/0093245 A1 | 5/2006 | Han | G11B 19/2018 |
| 2007/0296156 A1 | 12/2007 | Yanagisawa et al. | F16J 15/34 |
| 2008/0100001 A1 | 5/2008 | Flaherty | 277/400 |
| 2008/0272552 A1 | 11/2008 | Zheng | 277/400 |
| 2010/0066027 A1 | 3/2010 | Vasagar | 277/350 |
| 2011/0101616 A1 | 5/2011 | Teshima | 277/358 |
| 2012/0018957 A1 | 1/2012 | Watanabe | 277/387 |
| 2013/0189294 A1 | 7/2013 | Koelle et al. | F16J 15/34 |
| 2013/0209011 A1 | 8/2013 | Tokunaga | F16C 32/0633 |
| 2014/0203517 A1 | 7/2014 | Ferris | F16K 15/3412 |
| 2015/0115537 A1 | 4/2015 | Tokunaga | F16J 15/34 |
| 2015/0123350 A1 | 5/2015 | Itadani | 277/400 |
| 2015/0184752 A1 | 7/2015 | Itadani | F16J 15/3412 |
| 2015/0226334 A1 | 8/2015 | Itadani | F16J 15/342 |
| 2015/0240950 A1 | 8/2015 | Takahashi | F16J 15/363 |
| 2015/0260292 A1 | 9/2015 | Inoue et al. | F16J 15/342 |
| 2015/0377297 A1 | 12/2015 | Tokunaga et al. | F16C 33/748 |
| 2015/0377360 A1 | 12/2015 | Itadani | F16J 15/3412 |
| 2016/0003361 A1 * | 1/2016 | Takahashi | F16J 15/3408 |
| | | | 277/377 |
| 2016/0033045 A1 | 2/2016 | Itadani et al. | F16J 15/3412 |
| 2016/0097457 A1 | 4/2016 | Sun et al. | F16J 15/34 |
| 2016/0252182 A1 | 9/2016 | Itadani et al. | F16J 15/34 |
| 2017/0009889 A1 | 1/2017 | Seki | F16J 15/3272 |
| 2017/0114902 A1 * | 4/2017 | Itadani | F16J 15/3412 |
| 2017/0130844 A1 * | 5/2017 | Itadani | F16J 15/3412 |
| 2017/0167615 A1 | 6/2017 | Itadani | F16J 15/3412 |
| 2017/0198814 A1 | 7/2017 | Colombo et al. | F16J 15/3412 |
| 2017/0234431 A1 | 8/2017 | Katori et al. | F16J 15/3412 |
| 2017/0241549 A1 | 8/2017 | Itadani | F16J 15/40 |
| 2018/0051809 A1 | 2/2018 | Yoshida | F16J 15/3412 |
| 2018/0058584 A1 | 3/2018 | Miyazaki | F16J 15/164 |
| 2018/0073394 A1 | 3/2018 | Tokunaga et al. | F01D 25/183 |
| 2018/0128377 A1 | 5/2018 | Tokunaga et al. | F16J 15/342 |
| 2018/0128378 A1 | 5/2018 | Tokunaga et al. | F16J 15/342 |
| 2018/0135699 A1 * | 5/2018 | Tokunaga | F16J 15/348 |
| 2018/0195618 A1 * | 7/2018 | Itadani | F16J 15/342 |
| 2019/0178386 A1 | 6/2019 | Arai | F16J 15/3496 |
| 2019/0301522 A1 | 10/2019 | Negishi et al. | F16C 17/026 |
| 2019/0376558 A1 | 12/2019 | Kimura | F16C 33/743 |
| 2020/0182299 A1 | 6/2020 | Kimura | F16C 17/026 |
| 2021/0054935 A1 | 2/2021 | Kimura | F16J 15/3412 |
| 2021/0080006 A1 | 3/2021 | Sasaki | F16J 15/34 |
| 2021/0116029 A1 | 4/2021 | Kimura | F16J 15/324 |
| 2021/0116030 A1 | 4/2021 | Kimura | F16J 15/3412 |
| 2021/0116032 A1 | 4/2021 | Kimura | F16J 15/188 |
| 2021/0164571 A1 | 6/2021 | Kimura | F16J 15/3412 |
| 2022/0010835 A1 | 1/2022 | Inoue | F16C 17/045 |
| 2022/0099191 A1 | 3/2022 | Suzuki | F16C 33/103 |
| 2022/0145992 A1 * | 5/2022 | Miyazaki | F16C 33/107 |
| 2022/0275828 A1 | 9/2022 | Inoue | F16J 15/3424 |
| 2023/0258184 A1 * | 8/2023 | Suzuki | F04C 29/00 |
| | | | 418/206.7 |

FOREIGN PATENT DOCUMENTS

| | | | |
|---|---|---|---|
| CN | 1401924 | 3/2003 | F16J 15/16 |
| CN | 101749431 | 6/2010 | F16J 15/34 |
| CN | 101776152 | 7/2010 | F16J 15/48 |

(56) References Cited

FOREIGN PATENT DOCUMENTS

| | | | |
|---|---|---|---|
| CN | 201582390 | 9/2010 | ............ F16J 15/16 |
| CN | 103267132 | 8/2013 | ............ F16J 15/54 |
| CN | 103732958 | 4/2014 | ............ F16J 15/34 |
| CN | 103791097 | 5/2014 | ............ F16J 15/34 |
| CN | 104019237 | 9/2014 | ............ F16J 15/16 |
| CN | 104165229 | 11/2014 | ............ F16J 15/40 |
| CN | 105683632 | 6/2016 | ............ F04D 29/10 |
| CN | 106439037 | 2/2017 | ............ F16J 15/34 |
| CN | 206017723 | 3/2017 | ............ F16J 15/16 |
| CN | 107166036 | 9/2017 | ............ F16J 15/16 |
| CN | 107532724 | 1/2018 | ............ F16J 15/34 |
| CN | 107676484 | 2/2018 | ............ F16J 15/323 |
| CN | 108506494 | 9/2018 | ............ F16J 15/34 |
| DE | 36 19 489 | 12/1987 | ............ F16J 15/34 |
| DE | 4407453 | 9/1995 | ............ F16C 17/08 |
| EP | 0637706 | 8/1993 | ............ F16J 15/34 |
| EP | 0896163 | 2/1999 | ............ F16C 33/10 |
| EP | 2520835 | 11/2012 | ............ F16J 15/34 |
| EP | 2626604 | 8/2013 | ............ F16J 15/34 |
| EP | 2977655 | 1/2016 | ............ F16J 15/34 |
| EP | 3091258 | 11/2016 | ............ F16J 15/34 |
| EP | 3299686 | 3/2018 | ............ F16J 15/34 |
| EP | 3514414 | 7/2019 | ............ F16J 15/34 |
| EP | 3922872 | 12/2021 | ............ F16J 15/34 |
| EP | 3926187 | 12/2021 | ............ F16C 17/04 |
| EP | 3926188 | 12/2021 | ............ F16C 17/04 |
| EP | 3943765 | 1/2022 | ............ F16C 17/04 |
| GB | 1509482 | 5/1978 | ............ F16C 33/10 |
| JP | 36-6305 | 5/1961 | |
| JP | S49-33614 | 9/1974 | ............ F16J 15/34 |
| JP | S54-77305 | 6/1979 | ............ B06B 9/10 |
| JP | S55-177549 | 12/1980 | ............ F16J 15/16 |
| JP | S57-146955 | 9/1982 | ............ F16J 15/34 |
| JP | 58-109771 | 6/1983 | ............ F16J 15/34 |
| JP | 58-137667 | 8/1983 | ............ F16J 15/40 |
| JP | S59-58252 | 4/1984 | ............ F16J 15/34 |
| JP | S60-107461 | 7/1985 | ............ B63H 23/36 |
| JP | S6182177 | 5/1986 | ............ F16J 15/34 |
| JP | S62-37572 | 2/1987 | ............ F16J 51/34 |
| JP | S63-033027 | 3/1988 | ............ F16C 33/46 |
| JP | S63-190975 | 8/1988 | ............ F16J 15/34 |
| JP | H01133572 | 9/1989 | ............ F16J 15/34 |
| JP | 2-236067 | 9/1990 | ............ F16J 15/34 |
| JP | 3-14371 | 2/1991 | ............ F16J 15/34 |
| JP | 3-35372 | 4/1991 | ............ F16J 15/34 |
| JP | 3-41267 | 4/1991 | ............ F16J 15/34 |
| JP | 3-41268 | 4/1991 | ............ F16J 15/34 |
| JP | H04-73 | 1/1992 | ............ F16J 15/34 |
| JP | H04-145267 | 5/1992 | ............ F16J 15/34 |
| JP | H04-96671 | 8/1992 | ............ F16J 15/34 |
| JP | H05-90048 | 12/1993 | ............ F16J 15/34 |
| JP | H05-322050 | 12/1993 | ............ F16J 15/34 |
| JP | H07-55016 | 3/1995 | ............ F16J 15/34 |
| JP | H08-89489 | 4/1996 | ............ A61B 5/05 |
| JP | H09-503276 | 3/1997 | ............ F16J 15/34 |
| JP | H09-329247 | 12/1997 | ............ F16J 15/34 |
| JP | H10-38093 | 2/1998 | ............ F16J 15/34 |
| JP | H10-281299 | 10/1998 | ............ F16J 15/34 |
| JP | 2000-179543 | 6/2000 | ............ F16C 17/10 |
| JP | 2001-295833 | 10/2001 | ............ F16C 17/04 |
| JP | 2001-317638 | 11/2001 | ............ F16J 15/34 |
| JP | 2003-161322 | 6/2003 | ............ F16C 33/10 |
| JP | 2003-343741 | 12/2003 | ............ F16J 15/34 |
| JP | 2004-003578 | 1/2004 | ............ F16J 15/34 |
| JP | 2005-188651 | 7/2005 | ............ F16J 15/34 |
| JP | 2005-58051 | 12/2005 | ............ F16C 33/74 |
| JP | 2006-9828 | 1/2006 | ............ F16C 17/02 |
| JP | 2006-022834 | 1/2006 | ............ F16J 15/34 |
| JP | 2006-77899 | 3/2006 | ............ F16J 15/34 |
| JP | 2008-144864 | 6/2008 | ............ F16C 33/10 |
| JP | 2009-250378 | 10/2009 | ............ F16J 15/34 |
| JP | 2010-133496 | 6/2010 | ............ F16J 15/34 |
| JP | 2010-216587 | 9/2010 | ............ F16J 15/34 |
| JP | 2011-185292 | 9/2011 | ............ F16J 15/34 |
| JP | 2011196429 | 10/2011 | ............ F16J 15/34 |
| JP | 2012-2295 | 1/2012 | ............ F16J 15/34 |
| JP | 5271858 | 5/2013 | ............ F16J 15/34 |
| JP | 2016-80090 | 5/2016 | ............ F16J 15/34 |
| JP | 2017-141961 | 8/2017 | ............ F16J 15/34 |
| JP | 6444492 | 12/2018 | ............ F16J 15/34 |
| JP | 2019-15401 | 1/2019 | ............ F16J 15/34 |
| JP | 201913446 | 1/2019 | ............ A47J 27/00 |
| WO | WO 95/06832 | 3/1995 | ............ F16J 15/34 |
| WO | WO 2012/046749 | 4/2012 | ............ F16J 15/34 |
| WO | WO 2014/024742 | 2/2014 | ............ F16J 15/34 |
| WO | WO 2014/050920 | 4/2014 | ............ F16J 15/34 |
| WO | WO 2014/103630 | 7/2014 | ............ F16J 15/34 |
| WO | WO 2014/112455 | 7/2014 | ............ F16J 15/34 |
| WO | WO2014103631 | 7/2014 | ............ F16J 15/34 |
| WO | WO 2014/148316 | 9/2014 | ............ F16J 15/34 |
| WO | WO 2014/174725 | 10/2014 | ............ F16J 15/34 |
| WO | WO 2016/009408 | 1/2016 | ............ F16J 15/34 |
| WO | WO 2016/035860 | 3/2016 | ............ F16J 15/34 |
| WO | WO 2016/167262 | 10/2016 | ............ F16J 15/34 |
| WO | WO 2016/186019 | 11/2016 | ............ F16J 15/34 |
| WO | WO2016203878 | 12/2016 | ............ F16J 15/34 |
| WO | WO 2017/002774 | 1/2017 | ............ F16J 15/34 |
| WO | WO 2018/034197 | 2/2018 | ............ F16J 15/34 |
| WO | WO 2018/105505 | 6/2018 | ............ F16J 15/34 |
| WO | WO2018139231 | 8/2018 | ............ F16J 15/34 |
| WO | WO2018139232 | 8/2018 | ............ F16C 33/10 |

OTHER PUBLICATIONS

European Search Report issued in application No. 20847261.3, dated Jul. 17, 2023, 8 pages.
Korean Official Action issued in Korean Patent Application Serial No. 10-2021-7028879, dated Jun. 28, 2023, 10 pages.
Official Action issued in related U.S. Appl. No. 17/428,909, dated Jul. 25, 2023, 8 pages.
Notice of Allowance issued in related U.S. Appl. No. 17/296,466, dated Jul. 24, 2023, 9 pages.
International Preliminary Report on Patentability issued in PCT/JP2020/027005, dated Feb. 1, 2022, 4 pages.
International Search Report and Written Opinion issued in PCT/JP2020/027005, dated Sep. 1, 2020, with English translation, 11 pages.
International Preliminary Report on Patentability issued in PCT/JP2019/032723, dated Mar. 2, 2021, 6 pages.
International Search Report and Written Opinion issued in PCT/JP2019/032723, dated Nov. 5, 2019, with English translation, 17 pages.
International Preliminary Report on Patentability issued in PCT/JP2019/029771, dated Feb. 2, 2021, 7 pages.
International Search Report and Written Opinion issued in PCT/JP2019/029771, dated Sep. 17, 2019, with English translation, 20 pages.
International Preliminary Report on Patentability issued in PCT/JP2019/040209, dated Apr. 27, 2021, 6 pages.
International Search Report and Written Opinion issued in PCT/JP2019/040209, dated Dec. 24, 2019, with English translation, 17 pages.
International Preliminary Report on Patentability issued in PCT/JP2019/038155, dated Mar. 23, 2021, 6 pages.
International Search Report and Written Opinion issued in PCT/JP2019/038155, dated Nov. 19, 2019, with English translation, 18 pages.
Chinese Office Action issued in application No. 201980076998.4 (with translation), dated Jan. 18, 2023, 12 pages.
Chinese Office Action issued in application No. 201980059152.X (with translation), dated Oct. 10, 2022, 14 pages.
Chinese Office Action issued in application No. 202080012994.2 (with translation), dated Feb. 2, 2023, 13 pages.
Chinese Office Action issued in application No. 202080012994.2 (with translation), dated Apr. 24, 2023, 12 pages.
Chinese Office Action issued in application No. 201980082245.4 (with translation), dated Feb. 16, 2023, 23 pages.
European Official Action issued in application No. 19869466.3, dated Mar. 16, 2023, 7 pages.

(56) References Cited

OTHER PUBLICATIONS

European Official Action issued in application No. 22212136.0, dated Mar. 15, 2023, 8 pages.
European Official Action issued in application No. 19850900.2, dated Mar. 28, 2023, 4 pages.
European Official Action issued in application No. 23155551.7, dated Feb. 28, 2023, 7 pages.
European Official Action issued in application No. 19888532.9, dated Mar. 7, 2023, 3 pages.
European Official Action issued in application No. 23158438.4, dated May 15, 2023, 11 pages.
Japanese Decision of Refusal issued in application No. 2021-502065, dated May 23, 2023, 8 pages.
Korean Official Action issued in Korean Patent Application Serial No. 10-2021-7002193, dated Jan. 11, 2023, 11 pages.
Korean Official Action issued in Korean Patent Application Serial No. 10-2021-7022185, dated Apr. 6, 2023, 12 pages.
Korean Official Action issued in Korean Patent Application Serial No. 10-2021-7016898, dated Feb. 16, 2023, 13 pages.
Official Action issued in related U.S. Appl. No. 17/413,466, dated Apr. 12, 2023, 11 pages.
Official Action issued in related U.S. Appl. No. 17/296,466, dated Apr. 12, 2023, 9 pages.
Official Action issued in related U.S. Appl. No. 17/428,909, dated Apr. 21, 2023, 8 pages.
Official Action issued in related U.S. Appl. No. 17/628,158, dated May 15, 2023, 14 pages.
European Official Action issued in related European Patent Application Serial No. 19850900.2, dated Mar. 31, 2022, 11 pages.
European Official Action issued in related European Patent Application Serial No. 19843273.4, dated Mar. 24, 2022, 9 pages.
Chinese Office Action issued in application No. 201980082245.4 (with translation), dated Aug. 3, 2023, 25 pages.
European Official Action issued in application No. 19876680.0, dated Aug. 24, 2023, 8 pages.
Korean Official Action issued in Korean Patent Application Serial No. 10-2022-7002564, dated Jun. 27, 2023, 11 pages with translation.
Korean Official Action issued in Korean Patent Application Serial No. 10-2021-7028347, dated Jun. 22, 2023, 11 pages with translation.
Korean Official Action issued in Korean Patent Application Serial No. 10-2021-7009776, dated Jun. 28, 2023, 8 pages with translation.
Official Action issued in related U.S. Appl. No. 17/420,660, dated Sep. 13, 2023, 10 pages.
Notice of Allowance issued in related U.S. Appl. No. 17/296,466, dated Jul. 24, 2023, 11 pages.
Notice of Allowance issued in related U.S. Appl. No. 17/259,336, dated Sep. 19, 2023, 8 pages.
Chinese Office Action issued in application No. 201980087670.2 (with translation), dated Jul. 1, 2022 (17 pgs).
Chinese Office Action issued in application No. 201980043720.7 (with translation), dated Jun. 6, 2022 (12 pgs).
Chinese Office Action issued in application No. 202080014381.2 (with translation), dated Aug. 11, 2022 (15 pgs).
Chinese Office Action issued in application No. 202080012994.2 (with translation), dated Aug. 29, 2022 (14 pgs).
European Official Action issued in related European Patent Application Serial No. 19869466.3, dated May 19, 2022, 9 pages.
European Official Action issued in related European Patent Application Serial No. 19876680.0, dated Jun. 3, 2022, 8 pages.
European Official Action issued in related European Patent Application Serial No. 19888532.9, dated Jul. 8, 2022, 7 pages.
European Official Action issued in related European Patent Application Serial No. 19899646.4, dated Aug. 12, 2022, 9 pages.
Korean Office Action issued in application No. 10-2020-7037305 (with translation), dated Jun. 24, 2022 (17 pgs).
Korean Office Action issued in application No. 10-2021-7002193 (with translation), dated Jul. 18, 2022 (13 pgs).
Office Action issued in U.S. Appl. No. 17/257,260, dated Jul. 6, 2022 (12 pgs).
U.S. Appl. No. 17/296,466, filed May 24, 2021, Inoue et al.
U.S. Appl. No. 17/413,466, filed Jun. 11, 2021, Imura et al.
U.S. Appl. No. 17/420,660, filed Jul. 2, 2021, Suzuki et al.
U.S. Appl. No. 17/428,909, filed Aug. 5, 2021, Tokunaga et al.
U.S. Appl. No. 17/603,561, filed Oct. 13, 2021, Imura et al.
Definition of groove by Merriam Webster.
Chinese Office Action issued in application No. 201380070532.6 (with translation), dated Jan. 28, 2016 (13 pgs).
Chinese Office Action issued in application No. 201380070532.6 (with translation), dated Sep. 20, 2016 (12 pgs).
Second Office Action issued by the State Intellectual Property Office of China, mailed Aug. 29, 2016, for Chinese counterpart application No. 201480002574.0, 8 pages.
First Notification of Reason for Refusal issued by the State Intellectual Property Office of China, mailed Dec. 24, 2015, with a search report for Chinese counterpart application No. 201480002574.0, 11 pages.
Office Action issued in U.S. Appl. No. 14/431,733, dated Apr. 29, 2016 (22 pgs).
Office Action issued in U.S. Appl. No. 14/431,733, dated Aug. 18, 2017 (13 pgs).
Office Action issued in U.S. Appl. No. 14/431,733, dated Mar. 31, 2017 (14 pgs).
Office Action issued in U.S. Appl. No. 14/431,733, dated Oct. 6, 2016 (12 pgs).
Office Action issued in U.S. Appl. No. 15/419,989, dated Jan. 26, 2018 (20 pgs).
Office Action issued in U.S. Appl. No. 15/419,970, dated May 11, 2018 (17 pgs).
Office Action issued in U.S. Appl. No. 15/419,970, dated Jan. 23, 2018 (21 pgs).
Office Action issued in U.S. Appl. No. 15/842,862, dated Jun. 5, 2019 (37 pgs).
Office Action issued in U.S. Appl. No. 15/842,855, dated Mar. 12, 2020 (11 pgs).
Office Action issued in U.S. Appl. No. 15/842,855, dated Jun. 29, 2020, 16 pages.
Office Action issued in U.S. Appl. No. 15/842,858, dated Mar. 31, 2020 (10 pgs).
Office Action issued in U.S. Appl. No. 15/842,859, dated Apr. 8, 2020 (12 pgs).
Notice of Allowance issued in U.S. Appl. No. 15/419,970, dated Aug. 9, 2018 (16 pgs).
Notice of Allowance issued in U.S. Appl. No. 14/431,733, dated Feb. 23, 2018 (22 pgs).
Notice of Allowance issued in U.S. Appl. No. 15/419,989, dated Jul. 23, 2018 (11 pgs).
Notice of Allowance issued in U.S. Appl. No. 15/842,862, dated Sep. 30, 2019, 15 pages.
Japanese Office Action (w/translation) issued in application 2018-159877, dated Jun. 13, 2019 (7 pgs).
International Search Report issued in application No. PCT/JP2013/084029, dated Mar. 25, 2014 (4 pgs).
International Preliminary Report on Patentability issued in application No. PCT/JP2013/084029, dated Nov. 5, 2015 (8 pgs).
International Search Report and Written Opinion issued in PCT/JP2014/050402, dated Feb. 10, 2014, with English translation, 12 pages.
International Preliminary Report on Patentability issued in PCT/JP2014/050402, dated Jul. 21, 2015, 4 pages.
International Search Report and Written Opinion issued in PCT/JP2019/045728, dated Dec. 17, 2019, with English translation, 13 pages.
International Preliminary Report on Patentability issued in PCT/JP2019/045728, dated May 25, 2021, 7 pages.
International Search Report and Written Opinion issued in PCT/JP2019/047890, dated Feb. 10, 2020, with English translation, 13 pages.
International Preliminary Report on Patentability issued in PCT/JP2019/047890, dated Aug. 10, 2021, 7 pages.

(56) References Cited

OTHER PUBLICATIONS

International Search Report and Written Opinion issued in PCT/JP2019/049870, dated Mar. 10, 2020, with English translation, 13 pages.
International Preliminary Report on Patentability issued in PCT/JP2019/049870, dated Jun. 16, 2021, 7 pages.
International Search Report and Written Opinion issued in PCT/JP2020/005260, dated Apr. 7, 2020, with English translation, 16 pages.
International Preliminary Report on Patentability issued in PCT/JP2020/005260, dated Aug. 10, 2021, 9 pages.
International Search Report and Written Opinion issued in PCT/JP2020/006421, dated Apr. 21, 2020, with English translation, 13 pages.
International Preliminary Report on Patentability issued in PCT/JP2020/006421, dated Aug. 10, 2021, 6 pages.
International Search Report and Written Opinion issued in PCT/JP2020/017170, dated Jun. 2, 2020, with English translation, 13 pages.
U.S. Appl. No. 17/257,260, filed Dec. 30, 2020, Okada.
U.S. Appl. No. 17/259,336, filed Jan. 11, 2021, Imura.
U.S. Appl. No. 17/275,505, filed Mar. 11, 2021, Tokunaga et al.
U.S. Appl. No. 17/277,282, filed Mar. 17, 2021, Tokunaga.
U.S. Appl. No. 17/628,158, filed Jan. 18, 2022, Inoue et al.
Chinese Office Action issued in application No. 201980065303,2 (with translation), dated Oct. 10, 2022 (13 pgs).
European Official Action issued in related European Patent Application Serial No. 19914452.8, dated Oct. 5, 2022, 10 pages.
European Official Action issued in related European Patent Application Serial No. 20756664.7, dated Oct. 14, 2022, 8 pages.
European Official Action issued in related European Patent Application Serial No. 20759684.2, dated Oct. 17, 2022, 7 pages.
Korean Office Action issued in application No. 10-2021-7019130 (with translation), dated Oct. 22, 2022 (13 pgs).
Korean Office Action issued in application No. 10-2021-7007194 (with translation), dated Nov. 7, 2022 (14 pgs).
Korean Office Action issued in application No. 10-2021-7009776 (with translation), dated Dec. 12, 2022 (19 pgs).
Notice of Allowance issued in U.S. Appl. No. 17/257,260, dated Nov. 23, 2022, 9 pages.
Chinese Office Action issued in application No. 201980076998.4 (with translation), dated Sep. 29, 2023, 7 pages.
European Official Action issued in application No. 20759684.2, dated Sep. 25, 2023, 6 pages.
Korean Official Action issued in Korean Patent Application Serial No. 10-2021-7000686, dated Aug. 22, 2023, 6 pages with translation.
Official Action issued in related U.S. Appl. No. 17/277,282, dated Oct. 6, 2023, 8 pages.

* cited by examiner

Fig.4
(a)
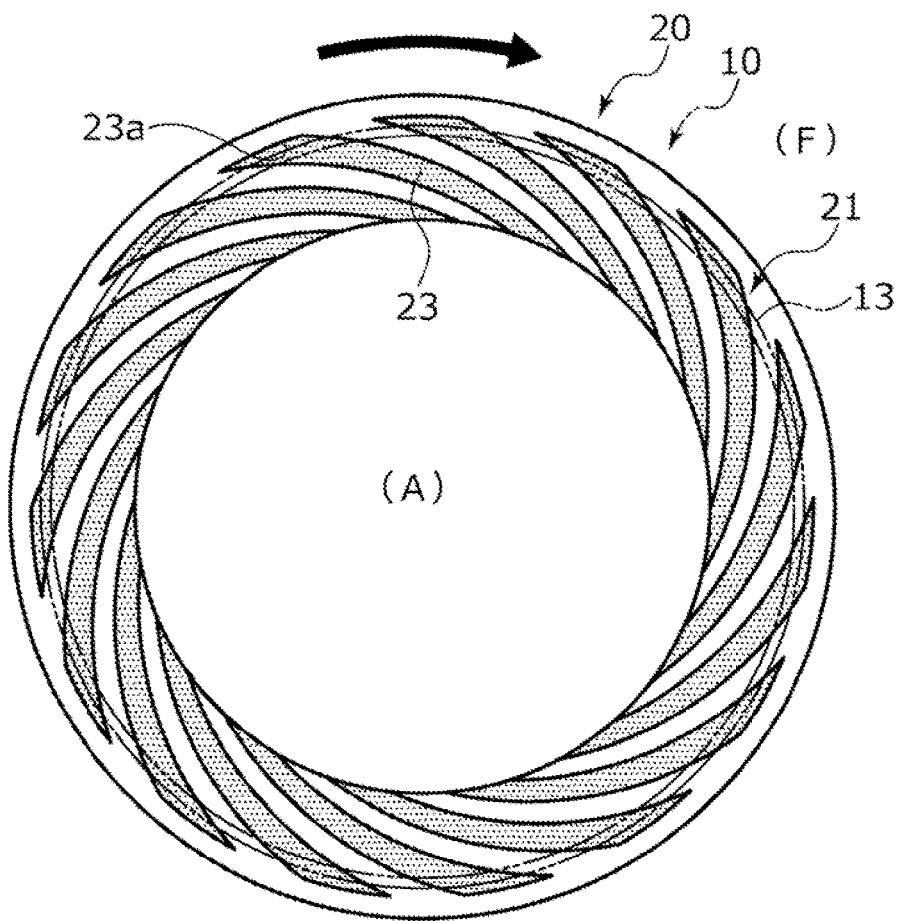
(b)
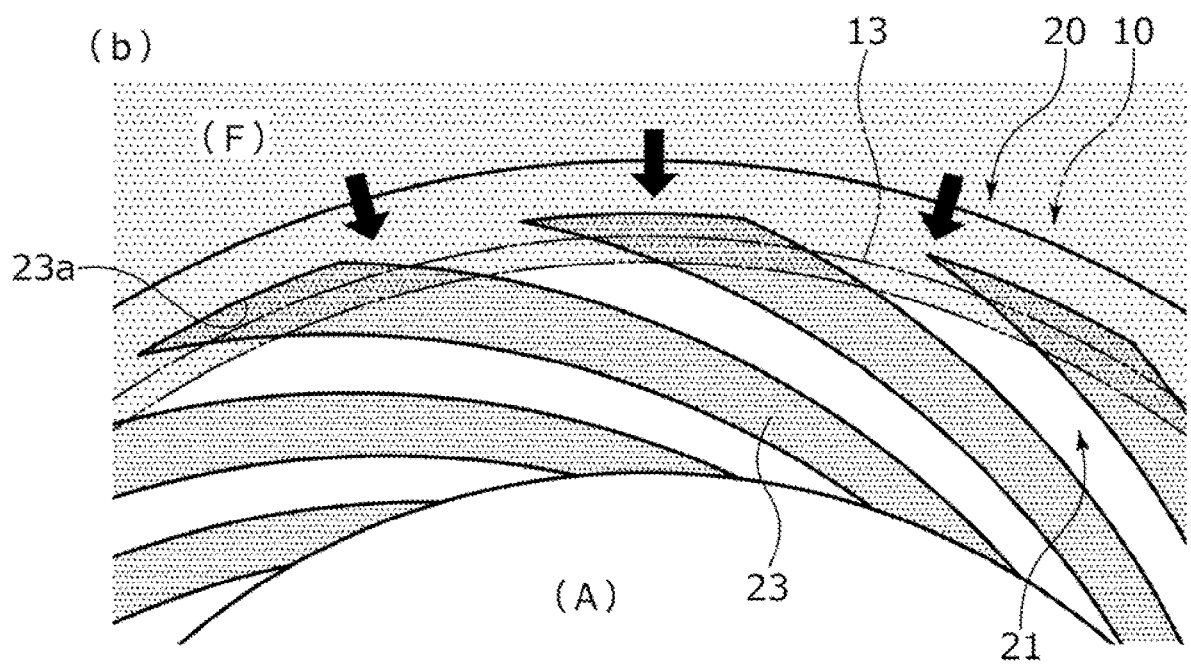

Fig.5
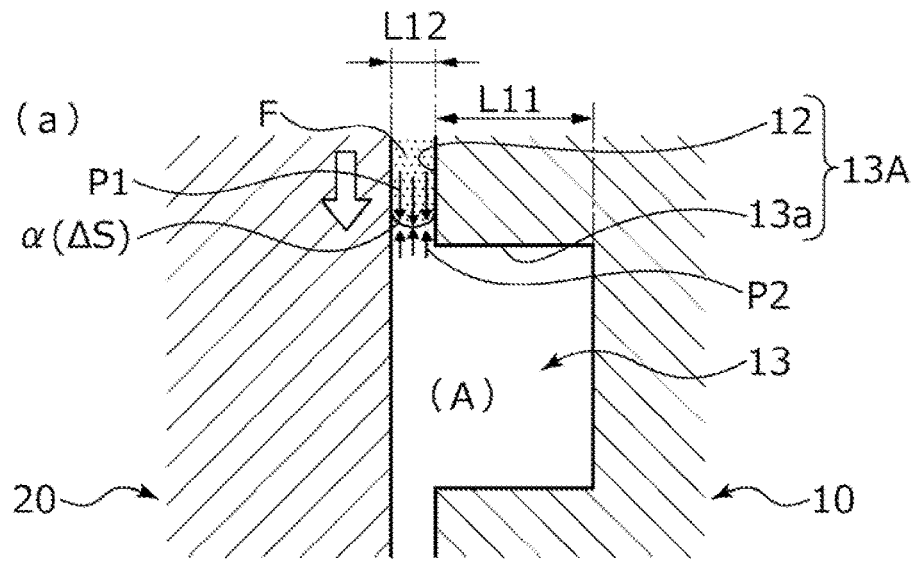
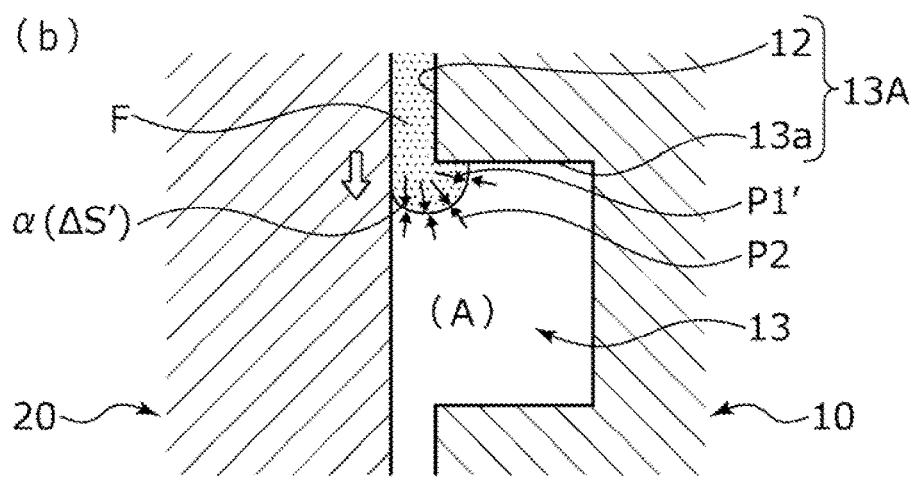
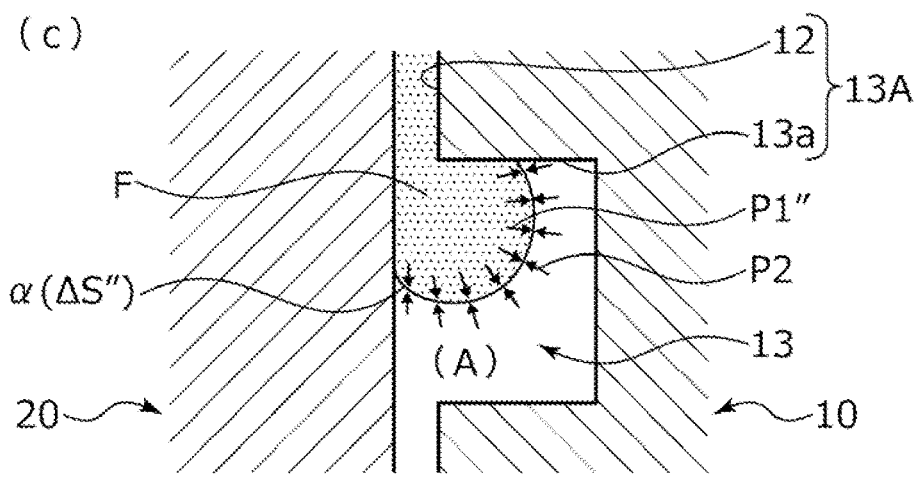

SLIDING COMPONENTS

TECHNICAL FIELD

The present invention relates to relatively rotating sliding components, for example, sliding components used in a shaft sealing device axially sealing a rotation shaft of a rotary machine in an automobile, a general industrial machine, or other sealing fields or sliding components used in a bearing of a rotary machine in an automobile, a general industrial machine, or other bearing fields.

BACKGROUND ART

Conventionally, as a shaft sealing device that axially seals a rotation shaft of a rotary machine such as a pump or a turbine and prevents a leakage of a sealed fluid, one including two components rotating relative to each other and sliding on each other on their flat end surfaces, for example, a mechanical seal is known. The mechanical seal includes a stationary seal ring which is a sliding component fixed to a housing and a rotating seal ring which is a sliding component fixed to a rotation shaft and rotating together with the rotation shaft and axially seals a gap between the housing and the rotation shaft by relatively rotating sliding surfaces thereof.

In such a mechanical seal, it has been recently desired to reduce energy lost due to sliding for environmental measures and sliding components such as Patent Citation 1 have been developed to reduce the energy lost due to sliding by reducing friction caused by sliding.

For example, the sliding components shown in Patent Citation 1 are mechanical seals in which a sealed liquid is present on an outer radial side and a gas is present on an inner radial side and a sliding surface of one sliding component is provided with a spiral dynamic pressure generation groove which communicates with a gas side and has a closed one end in the sliding surface. When the sliding components rotate relative to each other, a gas is taken into the dynamic pressure generation groove and the sliding surfaces are separated from each other by a positive pressure generated at the end of the dynamic pressure generation groove. That is, low friction is realized while the sliding surfaces are not in contact with each other.

CITATION LIST

Patent Literature

Patent Citation 1: WO 2017/002774 A (Page 8, FIG. 2)

SUMMARY OF INVENTION

Technical Problem

In Patent Citation 1, since the sealed liquid between the sliding surfaces enters the gas side due to the capillary phenomenon while the rotary machine is stopped, it takes a long time until the sealed liquid between the sliding surfaces is discharged to the sealed liquid side at the time of starting the rotary machine and takes a time until the sliding surfaces are not in contact with each other. As a result, there is concern that the high load at the time of starting the rotary machine may adversely affect the performance of the rotary machine.

The present invention has been made in view of such problems and an object of the present invention is to provide a sliding component capable of quickly shifting to a non-contact state by a gas at high-speed rotation.

Solution to Problem

In order to solve the foregoing problems, sliding components according to the present invention are a pair of sliding components disposed at a relatively rotating position at the time of driving a rotary machine and formed in an annular shape in which a sealed liquid is present on one side of an inner radial side and an outer radial side of the sliding components and a gas is present on remining side of the inner radial side and the outer radial side, in which the pair of sliding components is constituted by a first sliding component and a second sliding component which have sliding surfaces, respectively, the sliding surface of the first sliding component is provided with a dynamic pressure generation groove which communicates with a gas side in a radial direction and which is configured to generate a dynamic pressure between the sliding surfaces of the first and second sliding components by the gas during a running of the rotary machine, and at least one of the sliding surfaces of the first and second sliding components is provided with a groove which extends in a circumferential direction. According to the aforesaid feature of the present invention, since the sealed liquid enters the groove formed on at least one of the sliding surfaces of the first and the second sliding components when the rotary machine is stopped, the surface area of the gas-liquid interface increases and the sealed liquid can be further suppressed from entering the gas side by the surface tension of the wide gas-liquid interface. Therefore, since the amount of the sealed liquid to be discharged by a gas at the time of starting the rotary machine is small, the sliding surfaces can be in a short time shifted to a non-contact state.

It may be preferable that the groove is provided in the sliding surface of the second sliding component. According to this preferable configuration, since the dynamic pressure generation groove and the groove are dispersedly provided in both sliding components, the strength of the sliding surfaces of the sliding components can be maintained.

It may be preferable that the groove is disposed on the gas side with respect to a closed end of the dynamic pressure generation groove. According to this preferable configuration, the groove does not deteriorate the dynamic pressure generation function due to the dynamic pressure generation groove and the dynamic pressure generated by the dynamic pressure generation groove can be generated on the sealed liquid side. Further, it is possible to ensure a deep portion in which the groove and the dynamic pressure generation groove overlap with each other in the axial direction.

It may be preferable that the groove is formed to be deeper than the dynamic pressure generation groove. According to this preferable configuration, it is possible to cope with a wide surface area of the gas-liquid interface of the sealed liquid entering the groove.

It may be preferable that the groove includes a wall portion in which an angle formed between a side surface partially defining the groove on a sealed liquid side and the sliding surface of the second sliding component is 90° or less. According to this preferable configuration, it is possible to reliably and largely ensure the surface area of the gas-liquid interface of the sealed liquid entering the groove.

It may be preferable that the groove is formed so as to coil up one or more times in the circumferential direction. According to this preferable configuration, it is possible to suppress the sealed liquid from entering the gas side in the entire circumferential direction.

It may be preferable that the groove is a plurality of annular grooves provided in concentric circles. According to this preferable configuration, the ability of suppressing the sealed liquid from entering the gas side is high.

It may be preferable that the groove is formed in a spiral shape. According to this preferable configuration, the ability of suppressing the sealed liquid from entering the gas side is high. Further, since it is possible to ensure a long length of the groove, the lubricity at the time of starting the rotary machine is high due to the sealed liquid entering the groove.

In addition, in the groove extending in the circumferential direction according to the present invention, the groove may extend to have at least a circumferential component.

BRIEF DESCRIPTION OF DRAWINGS

FIG. 4A is a view in which the rotating seal ring is viewed from the sliding surface side while the sliding surfaces of the rotating seal ring and the stationary seal ring are combined with each other in the first embodiment and FIG. 4B is a main enlarged view of FIG. 4A.

FIGS. 5A to 5C are views describing a procedure in which a sealed liquid enters from a dynamic pressure generation groove into an annular groove in the first embodiment.

DESCRIPTION OF EMBODIMENTS

Figure 1:
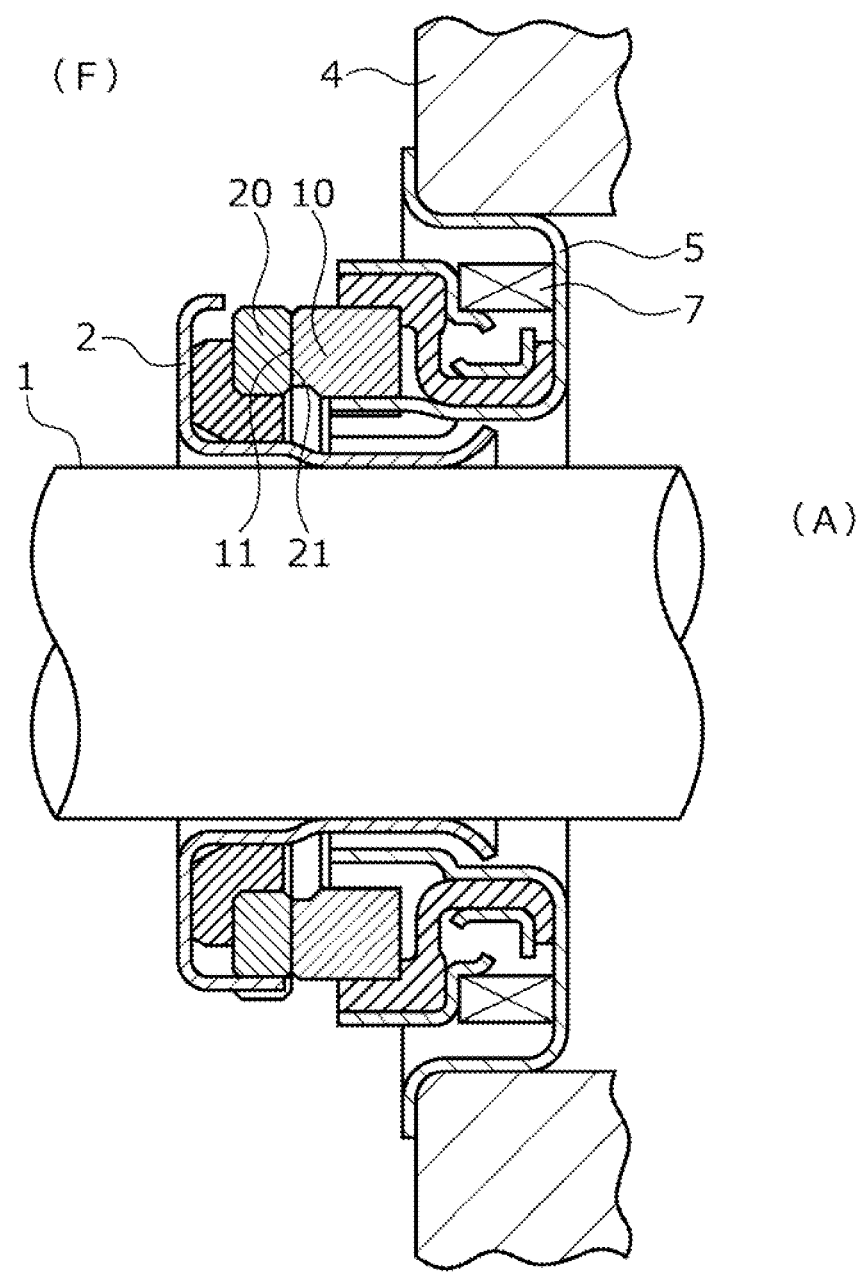
FIG. 1 is a cross-sectional view illustrating a structure of a rotary machine using a mechanical seal including sliding components according to a first embodiment of the present invention.

Modes for implementing sliding components according to the present invention will be described below based on embodiments.

First Embodiment

Sliding components according to a first embodiment of the present invention will be described with reference to FIGS. 1 to 7. Additionally, in this embodiment, an example in which a sliding component is a mechanical seal will be described. Further, an inner radial side of the sliding component constituting the mechanical seal will be described as an atmosphere side (i.e., low-pressure side) which is a leakage side and a gas side and an outer radial side thereof will be described as a sealed liquid side (i.e., high-pressure side). Further, for convenience of description, dots may be added to grooves and the like formed on a sliding surface in the drawings.

A mechanical seal for a general industrial machine illustrated in FIG. 1 is an inside type that seals a sealed liquid F that tends to leak from the outer radial side of the sliding surface toward the inner radial side thereof and mainly includes a rotating seal ring 20 which is an annular sliding component provided in a rotation shaft 1 through a sleeve 2 to be rotatable together with the rotation shaft 1 and a stationary seal ring 10 which is an annular sliding component provided in a seal cover 5 fixed to a housing 4 of an installation target device not to be rotatable and to be movable in the axial direction. When the stationary seal ring 10 is biased in the axial direction by a bellows 7, a sliding surface 11 of the stationary seal ring 10 and a sliding surface 21 of the rotating seal ring 20 slide closely with each other.

The stationary seal ring 10 and the rotating seal ring 20 are typically formed of SiC (as an example of hard material) or a combination of SiC (as the example of hard material) and carbon (as an example of soft material), but the present invention is not limited thereto. Any sliding material is applicable as long as the sliding material is used as the sliding material for the mechanical seal. In addition, examples of SiC include a sintered body using boron, aluminum, carbon, and the like as a sintering aid and materials composed of two or more types of phases having different components and compositions, for example, SiC obtained by dispersing graphite particles, reaction sintered SiC composed of SiC and Si, SiC—TiC, SiC—TiN, and the like and examples of carbon include carbon obtained by mixing carbon materials and graphite materials, resin molded carbon, sintered carbon, and the like. In addition to the above sliding materials, metal materials, resin materials, surface modification materials (e.g., coating materials), composite materials, and the like can also be applied.

Figure 2:
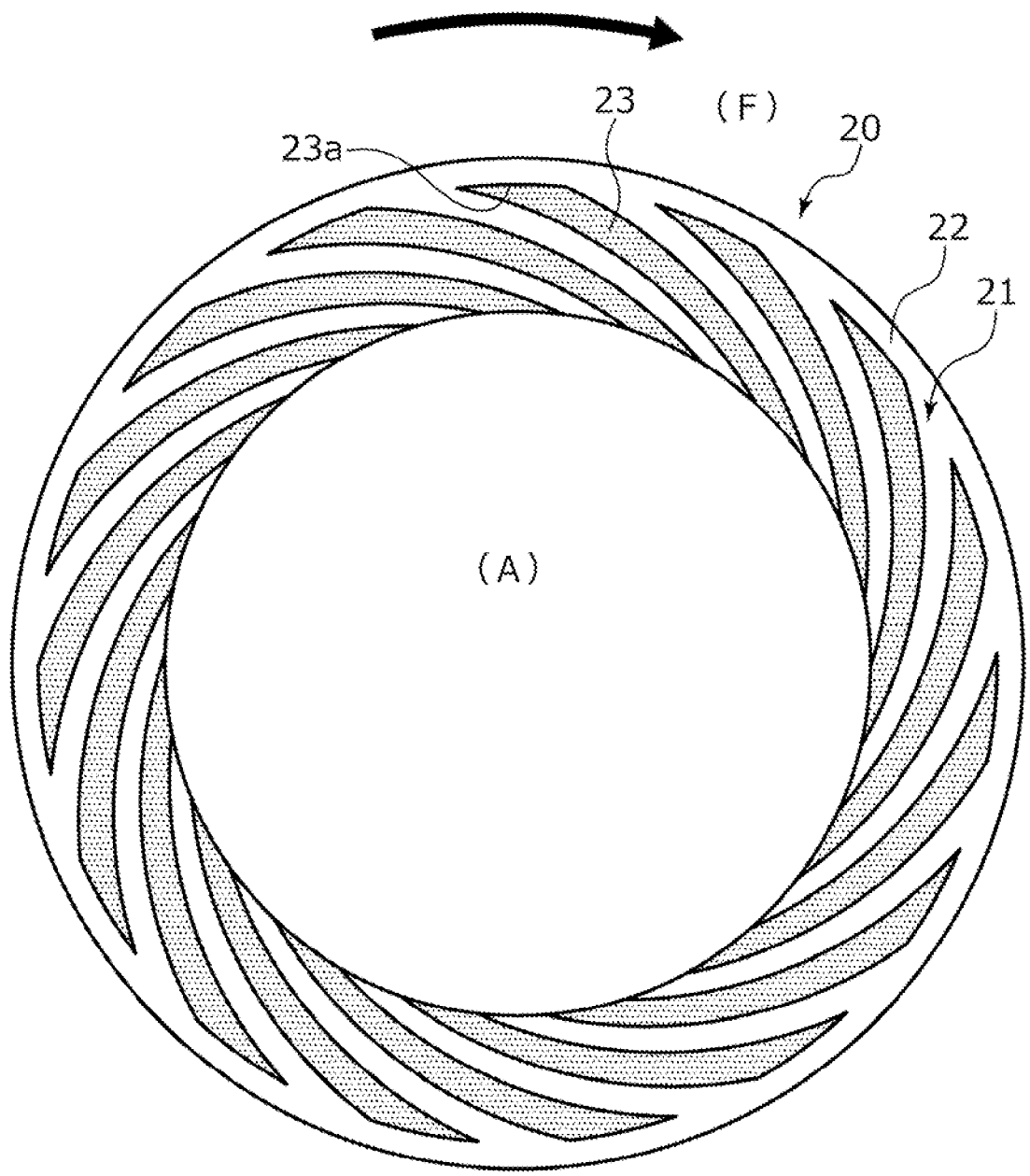
FIG. 2 is a view in which a rotating seal ring is viewed from a sliding surface side in the first embodiment.

As illustrated in FIG. 2, the rotating seal ring 20 relatively slide on the stationary seal ring 10 as indicated by an arrow and a plurality of dynamic pressure generation grooves 23 are formed in the sliding surface 21 of the rotating seal ring 20 to be separated from each other in the circumferential direction. Fifteen dynamic pressure generation grooves 23 are formed side-by-side in the circumferential direction in total and are formed at equal intervals in the circumferential direction. A portion other than the dynamic pressure generation groove 23 of the sliding surface 21 is a land 22 which forms a flat surface. In addition, the number of the dynamic pressure generation grooves 23 can be freely changed in accordance with the usage environment.

The dynamic pressure generation groove 23 is formed in an arc shape having a constant width when viewed from a direction orthogonal to the sliding surface 21, communicates with the atmosphere side corresponding to the inner radial side, and extends to the outer radial side to intersect in the radial direction and the circumferential direction. Specifically, the dynamic pressure generation groove 23 has a curved shape including a component extending in the circumferential direction and a component extending in the radial direction and among these, the component extending in the circumferential direction is larger.

The dynamic pressure generation groove 23 has a constant depth dimension L12 (see FIG. 5) over the entire length and a dynamic pressure is generated in the dynamic pressure generation groove 23 when the stationary seal ring 10 and the rotating seal ring 20 rotate relative to each other as described below. In addition, the depth dimension L12 of the dynamic pressure generation groove 23 of this first embodiment is 1 μm. Further, the width dimension and the depth dimension of the dynamic pressure generation groove 23 may be dimensions in which a dynamic pressure can be generated in the dynamic pressure generation groove 23 when the stationary seal ring 10 and the rotating seal ring 20 rotate relative to each other.

The dynamic pressure generation groove 23 can be formed by the mirror-processed sliding surface 21 to fine processing such as laser processing or sandblasting. Further, the dynamic pressure generation groove 23 is surrounded by four surfaces including two arc-shaped surfaces of the dynamic pressure generation groove 23, a wall portion 23a extending to intersect the arc-shaped surfaces, and a bottom surface parallel to the sliding surface 21 and an outer radial end portion is closed.

Figure 3:
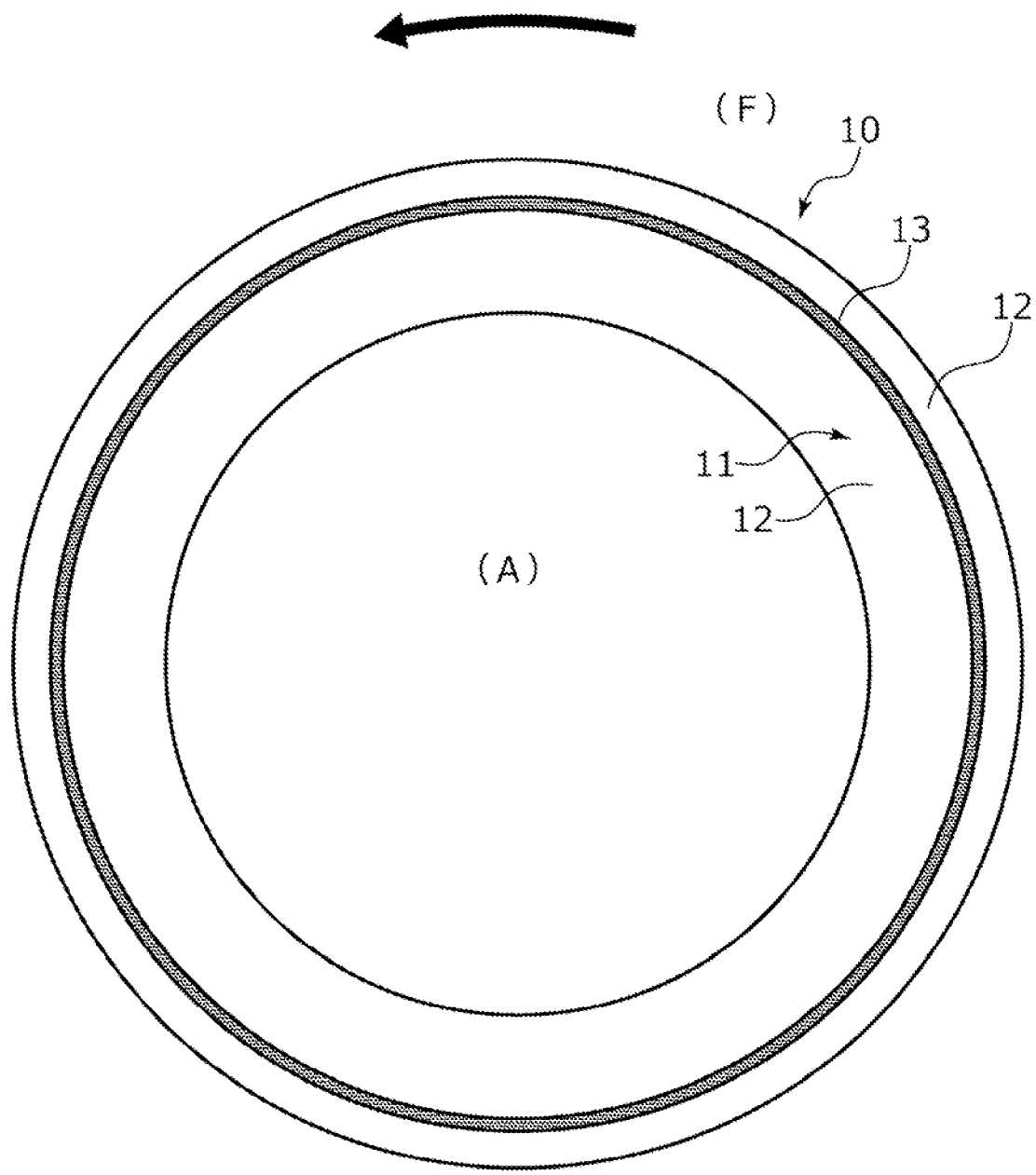
FIG. 3 is a view in which a stationary seal ring is viewed from a sliding surface side in the first embodiment.

As illustrated in FIG. 3, the sliding surface 11 of the stationary seal ring 10 is provided with an annular groove 13 which extends to be concentric with the stationary seal ring 10 and is continuous in the circumferential direction. A portion other than the annular groove 13 of the sliding surface 11 is a land 12 which forms a flat surface.

The annular groove 13 has a constant depth dimension L11 (see FIG. 5) over the entire length and a dynamic pressure is not generated when the stationary seal ring 10 and the rotating seal ring 20 rotate relative to each other. The depth dimension L11 of the annular groove 13 of this first embodiment is 5 μm.

Further, the wall portion 13A on the outer radial side, that is, the sealed liquid side of the annular groove 13 is formed by the land 12 of the sliding surface 11 and an outer surface 13a of the annular groove 13 and the land 12 and the outer surface 13a are orthogonal to each other.

In addition, the bottom surface of the dynamic pressure generation groove 23 is formed as a flat surface and is formed in parallel to the land 22, but does not prevent the flat surface from being provided with fine recesses or being formed to be inclined with respect to the land 22. Further, two arc-shaped surfaces of the dynamic pressure generation groove 23 extending in the circumferential direction are respectively orthogonal to the bottom surface of the dynamic pressure generation groove 23. Further, the bottom surface of the annular groove 13 is formed as a flat surface and is formed in parallel to the land 12, but does not prevent the flat surface from being provided with fine recesses or being formed to be inclined with respect to the land 12. Further, two arc-shaped surfaces of the annular groove 13 extending in the circumferential direction are respectively orthogonal to the bottom surface of the annular groove 13.

As illustrated in FIGS. 4A and 4B, the annular groove 13 is disposed on the inner radial side corresponding to the low-pressure side of the wall portion 23a of the dynamic pressure generation groove 23 in a state in which the sliding surface 11 of the stationary seal ring 10 and the sliding surface 21 of the rotating seal ring 20 overlap each other. In other words, the outer radial end portion of the dynamic pressure generation groove 23 is disposed on the outer radial side corresponding to the high-pressure side of the annular groove 13.

Next, a case in the non-operation state of the general industrial machine will be described. As illustrated in FIG. 4B, in the mechanical seal of this embodiment, the sealed liquid F is suppressed from entering the inner radial side from the annular groove 13 in a non-operation state of a general industrial machine in which the rotating seal ring 20 does not rotate.

Specifically, when the general industrial machine stops, the sealed liquid F enters between the sliding surfaces 11 and 21 from the outer radial side of the sliding surfaces 11 and 21 and flows in the dynamic pressure generation groove 23 to the inner radial side as illustrated in FIG. 5A. At this time, since a depth dimension L12 of the dynamic pressure generation groove 23 is constant, the flow velocity of the sealed liquid F is substantially constant. Further, the pressure on the side of the sealed liquid F on a gas-liquid interface α becomes a pressure P1 and the pressure P1 on the side of the sealed liquid F becomes larger than a pressure P2 of a low-pressure side fluid (i.e., gas) A (i.e., P1>P2).

Here, pressure loss ΔP due to the surface tension γ is derived according to the following formula (i.e., the formula of Young-Laplace) on the assumption that the flow rate ΔV of the sealed liquid F entering between the sliding surfaces 11 and 21 is constant.

$$\Delta P = \gamma \Delta S / \Delta V$$

That is, the pressure loss ΔP increases as the surface area ΔS of the gas-liquid interface α increases.

As illustrated in FIG. 5B, the sealed liquid F reaches the annular groove 13. Since the volume of the annular groove 13 is larger than that of the dynamic pressure generation groove 23, the sealed liquid F reaching the annular groove 13 has a surface area ΔS' as a surface area ΔS of a gas-liquid interface α between the sealed liquid F and the low-pressure side fluid A increases (i.e., ΔS<ΔS'). As in the above formula, since the surface area ΔS' of the gas-liquid interface α of the sealed liquid F at the time point of FIG. 5B is larger than the surface area ΔS of the gas-liquid interface α at the time point of FIG. 5A, pressure loss ΔP' which is larger than the pressure loss ΔP generated in the sealed liquid F at the time point of FIG. 5A is generated (i.e., ΔP<ΔP'). Thus, the pressure P1' on the side of the sealed liquid F in the gas-liquid interface α at the time point of FIG. 5B is smaller than the pressure P1 on the side of the sealed liquid F at the time point of FIG. 5A (P1>P1'). Further, since the pressure P1' on the side of the sealed liquid F in the gas-liquid interface α at the time point of FIG. 5B is slightly larger than the pressure P2 of the low-pressure side fluid A, the sealed liquid F slightly enters the low-pressure side between the sliding surfaces 11 and 21 (i.e., P1'>P2).

Then, as illustrated in FIG. 5C, when the amount of the sealed liquid F reaching the annular groove 13 increases more than the state of FIG. 5B, the surface area ΔS' of the gas-liquid interface α further increases to become a surface area ΔS" (i.e., ΔS'<ΔS"). That is, pressure loss ΔP'" which is larger than the pressure loss ΔP' generated in the sealed liquid F at the time point of FIG. 5B is generated at the time point of FIG. 5C from the above formula (i.e., ΔP'<ΔP"). Thus, the pressure P1" on the side of the sealed liquid F in the gas-liquid interface α at the time point of FIG. 5C is smaller than the pressure P1' on the side of the sealed liquid F at the time point of FIG. 5B (i.e., P1'>P1"). Further, the pressure P1" on the side of the sealed liquid F in the gas-liquid interface α at the time point of FIG. 5C is substantially the same as the pressure P2 of the low-pressure side fluid A and the sealed liquid F is suppressed from entering the low-pressure side between the sliding surfaces 11 and 21 (i.e., P1"=P2).

In addition, since a gap between the lands 12 and 22 of the sliding surfaces 11 and 21 is extremely smaller than the depth dimension L12 of the dynamic pressure generation groove 23 and the sealed liquid F substantially does not flow to a portion in which the land 22 and the annular groove 13 overlap each other in the axial direction, the drawing and the description thereof are omitted. However, also in the corresponding portion, the sealed liquid F entering into the annular groove 13 is further suppressed from entering the leakage side as described above.

Next, an operation when driving the general industrial machine will be described with reference to FIGS. 6 and 7.

Figure 6:
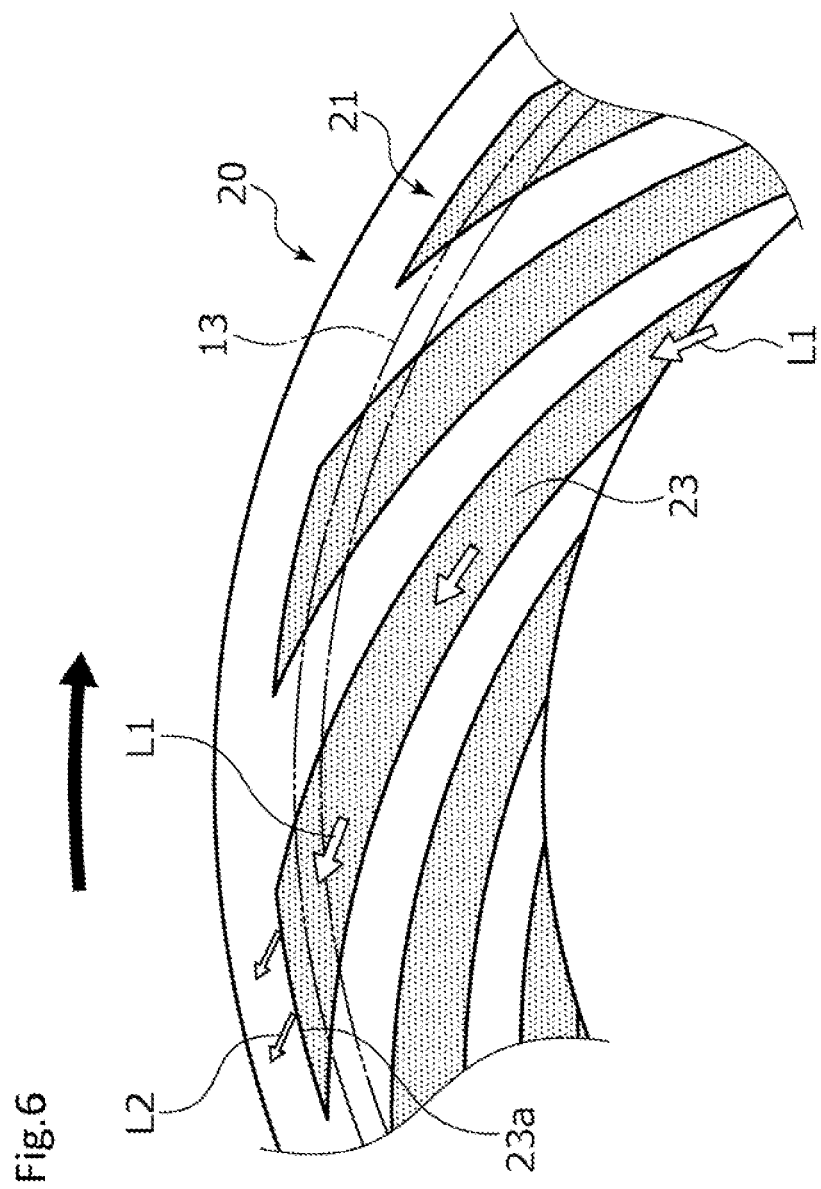
FIG. 6 is a conceptual diagram illustrating a movement of a fluid when a rotary machine rotates at an extremely low speed in the first embodiment.

FIG. 6 is a diagram illustrating the case of extremely low-speed rotation at the time of starting and the case of a stop state. In the extremely low-speed rotation, the low-pressure side fluid A on the leakage side is introduced from the inner radial side into the dynamic pressure generation groove 23 and is moved to the outer radial side as indicated by an arrow L1, so that a dynamic pressure is generated in the dynamic pressure generation groove 23. The pressure is the highest in the vicinity of the wall portion 23a which is the downstream end portion of the dynamic pressure generation groove 23 and the low-pressure side fluid A flows from the vicinity of the wall portion 23a to the periphery thereof as indicated by an arrow L2.

Further, since the rotation speed is low in the extremely low-speed rotation of the rotating seal ring 20 with respect to the stationary seal ring 10, the pressure is low in the vicinity of the wall portion 23a of the dynamic pressure generation groove 23 and the sealed liquid F is present on the high-pressure side of the annular groove 13 between the sliding surfaces 11 and 21. Accordingly, a liquid film is formed so that so-called fluid lubrication is performed.

Figure 7:
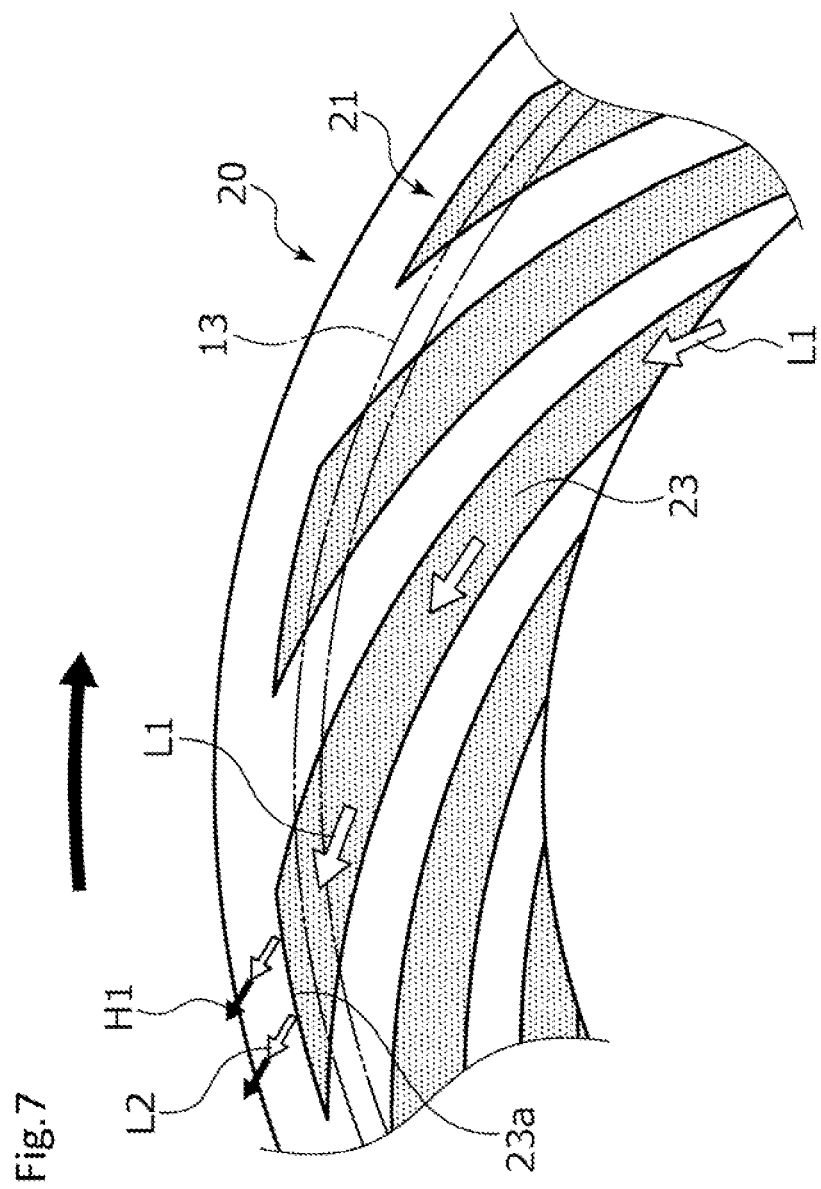
FIG. 7 is a conceptual diagram illustrating a movement of a fluid when the rotary machine rotates at a high speed in the first embodiment.

As illustrated in FIG. 7, when the general industrial machine shifts to the high-speed rotation, the flow rate of the low-pressure side fluid A increases as indicated by an arrow L1 so that a dynamic pressure generated in the vicinity of the wall portion 23a of the dynamic pressure generation groove 23 increases and the separation width between the sliding surfaces 11 and 21 slightly increases. Further, the sealed liquid F is discharged to the outer radial side of the sliding surfaces 11 and 21 by the high-pressure low-pressure side fluid A flowing out from the vicinity of the wall portion 23a of the dynamic pressure generation groove 23 to a gap between the sliding surfaces 11 and 21 as indicated by an arrow H1. In this way, non-contact lubrication is performed while the rotating seal ring 20 and the stationary seal ring 10 are separated from each other.

As described above, since the sealed liquid F between the sliding surfaces 11 and 21 enters the annular groove 13 when the general industrial machine is stopped, the surface area ΔS of the gas-liquid interface α increases and the sealed liquid F can be further suppressed from entering the low-pressure side fluid A side by the surface tension γ acting on the wide gas-liquid interface α, so that the sealed liquid F is held only outer radial side between the sliding surfaces 11 and 21. Therefore, since the amount of the sealed liquid F to be discharged by the low-pressure side fluid A at the time of starting the general industrial machine is small, the sliding surfaces 11 and 21 can be in a short time shifted to a non-contact state.

Specifically, the pressure loss ΔP due to the surface tension γ also increases as the surface area ΔS of the gas-liquid interface α increases. Since the pressure P1 on the side of the sealed liquid F in the gas-liquid interface α decreases as the pressure loss ΔP increases and the pressure P1 on the side of the sealed liquid F in the gas-liquid interface α and the pressure P2 of the low-pressure side fluid A are balanced, it is possible to suppress the sealed liquid F from entering the low-pressure side. Accordingly, it is possible to quickly shift to the non-contact lubrication using the low-pressure side fluid A from the fluid lubrication using the sealed liquid F and to improve the rotation performance of the general industrial machine by suppressing the rotation resistance during high-speed rotation.

Further, since the sliding surface 21 of the rotating seal ring 20 is provided with the dynamic pressure generation groove 23 and the sliding surface 11 of the stationary seal ring 10 is provided with the annular groove 13, it is possible to ensure the strength of the sliding surface 11 and the sliding surface 21 compared to a case in which any one of the stationary seal ring 10 and the rotating seal ring 20 is provided with the dynamic pressure generation groove 23 and the annular groove 13.

Further, the annular groove 13 is disposed on the low-pressure side of the wall portion 23a which is the end of the dynamic pressure generation groove 23. Accordingly, it is possible to prevent the low-pressure side fluid A flowing out from the vicinity of the wall portion 23a of the dynamic pressure generation groove 23 to a gap between the sliding surfaces 11 and 21 from entering the annular groove 13 during the relative rotation of the stationary seal ring 10 and the rotating seal ring 20 and to suppress deterioration of the dynamic pressure for separating the sliding surfaces 11 and 21 from each other. Further, the low-pressure side fluid A can flow out to the high-pressure side of the annular groove 13 between the sliding surfaces 11 and 21 from the vicinity of the wall portion 23a of the dynamic pressure generation groove 23.

Further, since the low-pressure side fluid A introduced from the low-pressure side into the dynamic pressure generation groove 23 first flows into the annular groove 13 to increase the pressure in the annular groove 13 and moves to the vicinity of the wall portion 23a of the dynamic pressure generation groove 23, the pressure of the low-pressure side fluid A flowing out from the vicinity of the wall portion 23a of the dynamic pressure generation groove 23 to a gap between the sliding surfaces 11 and 21 can be equalized in the circumferential direction.

Further, since the depth dimension L11 of the annular groove 13 is formed to be deeper than the depth dimension L12 of the dynamic pressure generation groove 23, it is possible to cope with a case in which the surface area of the gas-liquid interface α of the sealed liquid F entering the annular groove 13 is wide.

Further, since the wall portion 13A on the outer radial side, that is, the sealed liquid side of the annular groove 13 is formed by the land 12 of the sliding surface 11 and the outer surface 13a of the annular groove 13 and the land 12 and the outer surface 13a are orthogonal to each other, it is possible to reliably and largely ensure the surface area of the gas-liquid interface α of the sealed liquid F entering the annular groove 13.

Further, since the annular groove 13 continuously extends in the circumferential direction, it is possible to suppress the sealed liquid F from entering the low-pressure side in the entire circumferential direction.

Further, in this first embodiment, an example has been described in which the dynamic pressure generation groove 23 is provided in the rotating seal ring 20 and the annular groove 13 is provided in the stationary seal ring 10. However, the dynamic pressure generation groove 23 may be provided in the stationary seal ring 10, the annular groove 13 may be provided in the rotating seal ring 20, and the dynamic pressure generation groove 23 and the annular groove 13 may be provided in both the stationary seal ring 10 and the rotating seal ring 20.

Further, in this first embodiment, the annular groove 13 forming a perfect circle when viewed from the axial direction is illustrated as the groove, but may form an ellipse or an annular shape formed by a wavy line when viewed from the axial direction. Further, the groove is not limited to the annular shape, but may have a shape such as an arc shape having at least a component extending in the circumferential direction. When the groove forms an arc shape, it is preferable that a plurality of circumferential end portions be provided to overlap each other in the radial direction.

Further, in this first embodiment, the annular groove 13 is disposed to overlap the side of the wall portion 23a in the dynamic pressure generation groove 23, but may be disposed to overlap the leakage side or the center portion of the dynamic pressure generation groove 23.

Further, in this first embodiment, a case has been described in which the annular groove 13 is disposed on the leakage side of the wall portion 23a of the dynamic pressure generation groove 23, but the annular groove 13 may be disposed on the sealed liquid side of the wall portion 23a of the dynamic pressure generation groove 23.

Furthermore, the depth dimension of the annular groove 13 may be equal to or larger than the depth dimension of the dynamic pressure generation groove 23 and may be preferably formed to be deeper than the depth dimension of the dynamic pressure generation groove 23.

Second Embodiment

Next, sliding components according to a second embodiment of the present invention will be described with reference to FIG. 8. In addition, a description for the overlapping configuration of the same configuration as that of the first embodiment will be omitted.

Figure 8:
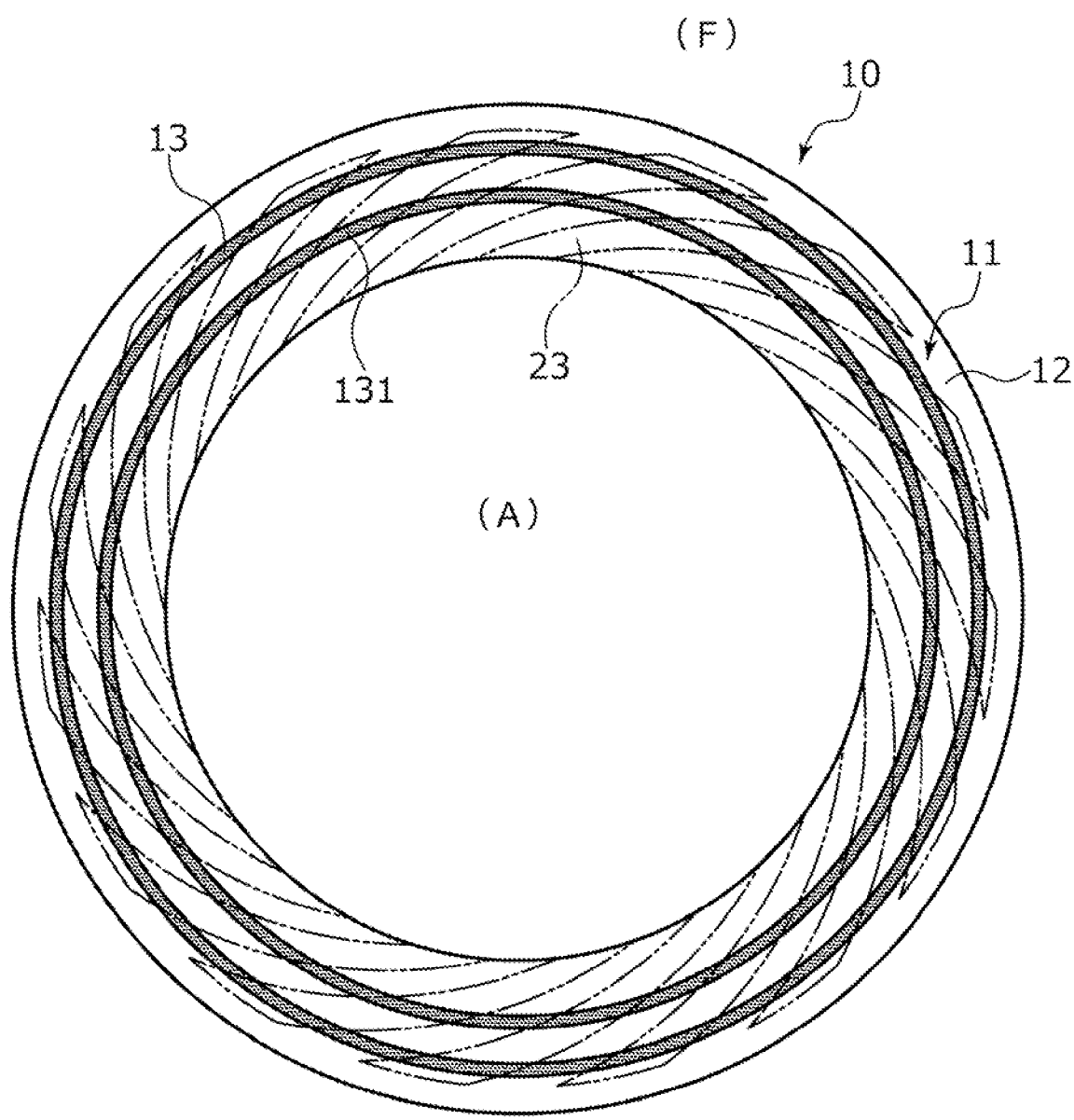
FIG. 8 is a view in which a stationary seal ring as one of sliding components according to a second embodiment of the present invention is viewed from a sliding surface side.

As illustrated in FIG. 8, the sliding surface 11 of the stationary seal ring 10 of this second embodiment is provided with the annular groove 13 and an annular groove 131 which is concentric with the annular groove 13 and has a diameter smaller than that of the annular groove 13. Accordingly, since the sealed liquid F enters the annular groove 131 on the inner radial side even when the sealed liquid F slightly enters the low-pressure side over the annular groove 13, it is possible to reliably suppress the sealed liquid F from entering the low-pressure side.

In addition, the annular grooves 13 and 131 are not limited to being formed concentrically, but a plurality of annular grooves having different shapes may be provided in the radial direction.

Third Embodiment

Next, sliding components according to a third embodiment of the present invention will be described with reference to FIG. 9. In addition, a description for the overlapping configuration of the same configuration as that of the first embodiment will be omitted.

Figure 9:
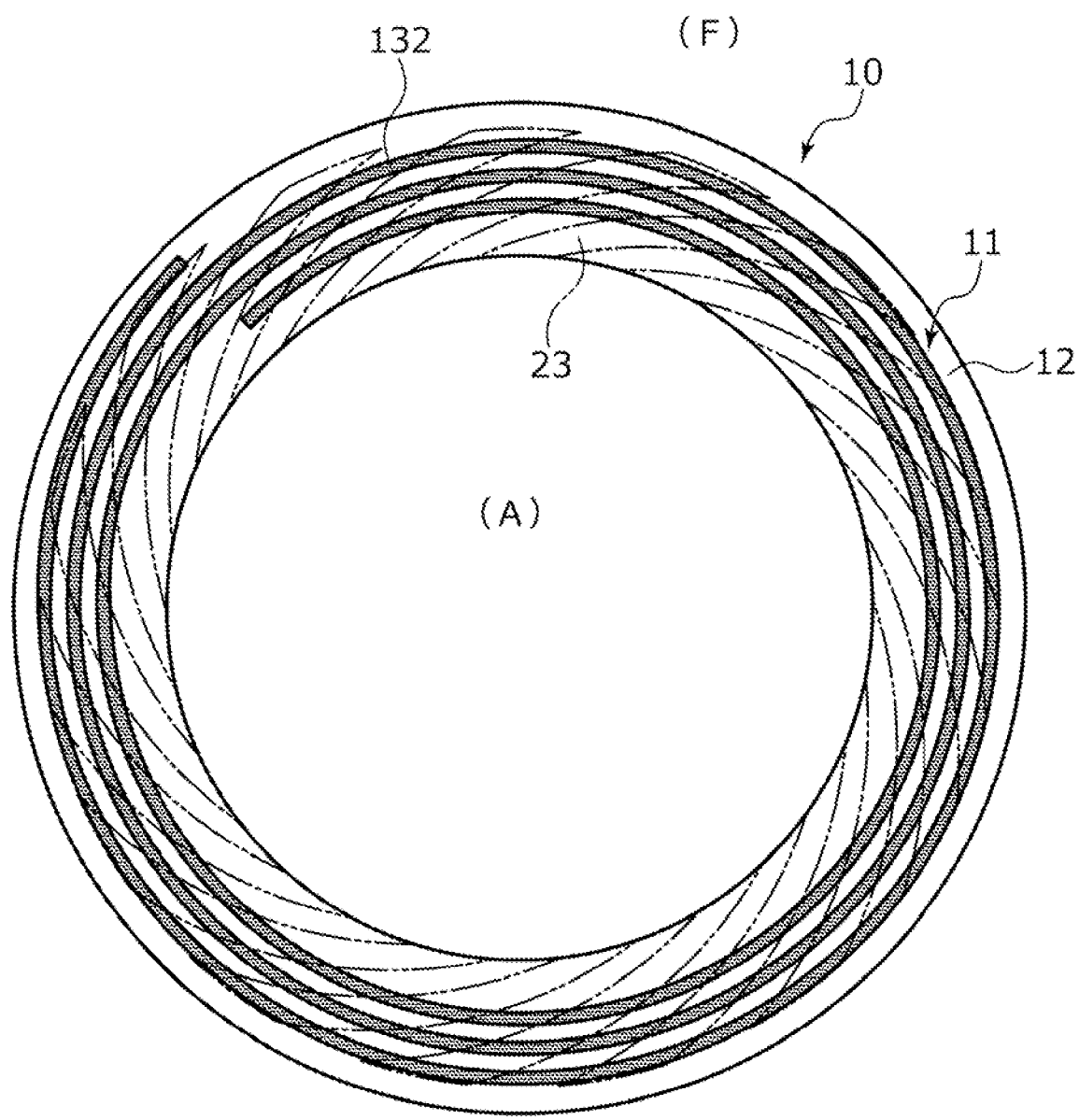
FIG. 9 is a view in which a stationary seal ring as one of sliding components according to third embodiment of the present invention is viewed from a sliding surface side.

As illustrated in FIG. 9, the sliding surface 11 of the stationary seal ring 10 of this third embodiment is provided with a spiral groove 132. The groove 132 extends so as to form a triple in the radial direction. Accordingly, since the sealed liquid F enters the groove 132 on the inner radial side even when the sealed liquid F slightly enters the low-pressure side over the groove 132 on the outer radial side, it is possible to reliably suppress the sealed liquid F from entering the low-pressure side. Further, since it is possible to have a long length of the groove 132, the amount of the sealed liquid F entering the groove 132 is large and the lubricity at the time of starting the general industrial machine is high due to the sealed liquid F.

In addition, the separation width of the overlapping portion of the groove 132 in the radial direction can be freely changed and the groove may extend one or more times in the circumferential direction.

Fourth Embodiment

Next, sliding components according to a fourth embodiment of the present invention will be described with reference to FIG. 10. In addition, a description for the overlapping configuration of the same configuration as that of the first embodiment will be omitted.

Figure 10:
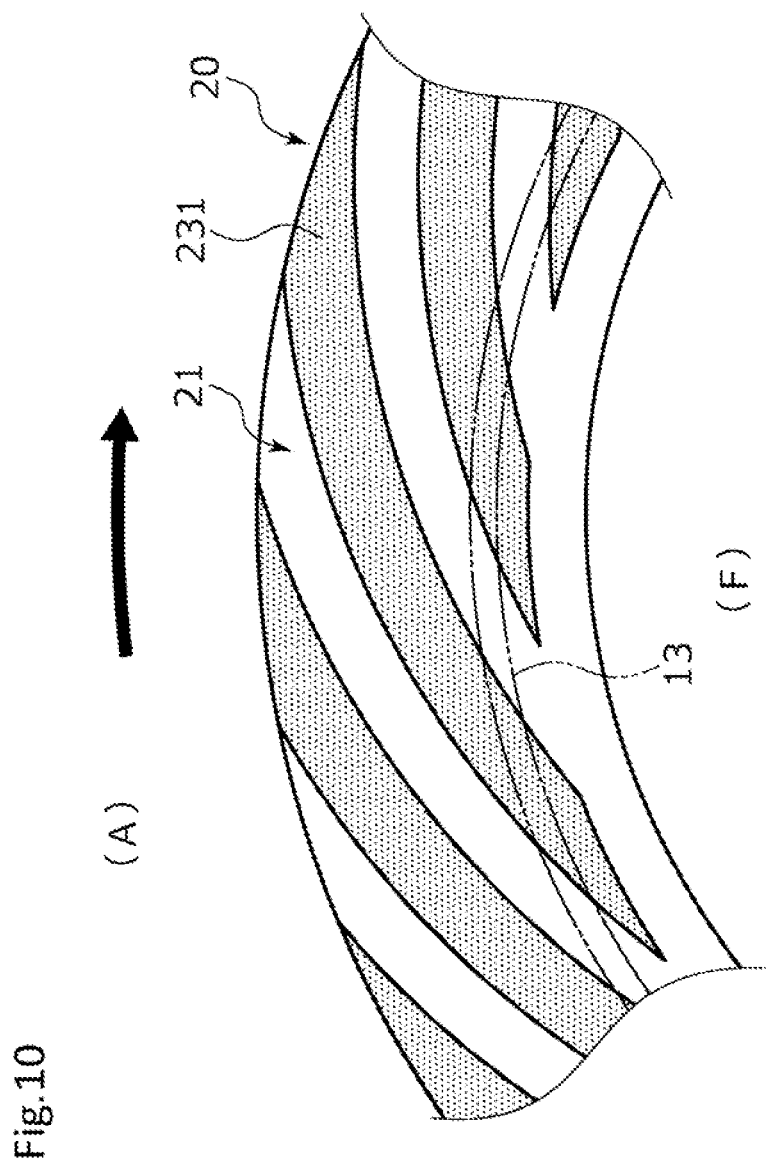
FIG. 10 is a main enlarged view in which a rotating seal ring as one of sliding components according to a fourth embodiment of the present invention is viewed from a sliding surface side.

As illustrated in FIG. 10, a dynamic pressure generation groove 231 of the rotating seal ring 20 of this fourth embodiment is disposed to communicate with the outer radial side of the rotating seal ring 20. That is, the mechanical seal of this fourth embodiment is an outside type mechanical seal that seals the sealed liquid F that tends to leak from the inner radial side of the sliding surfaces 11 and 21 to the outer radial side thereof.

In addition, also in the outside type mechanical seal, the annular groove 13 may be provided as in the first embodiment and the groove may be applied as in the second and third embodiments. Further, the specific dynamic pressure generation mechanism may not be provided as in the first to third embodiments and may be provided as in the fourth embodiment.

Fifth Embodiment

Next, sliding components according to a fifth embodiment will be described with reference to FIG. 11. In addition, a description for the overlapping configuration of the same configuration as that of the first embodiment will be omitted.

Figure 11:
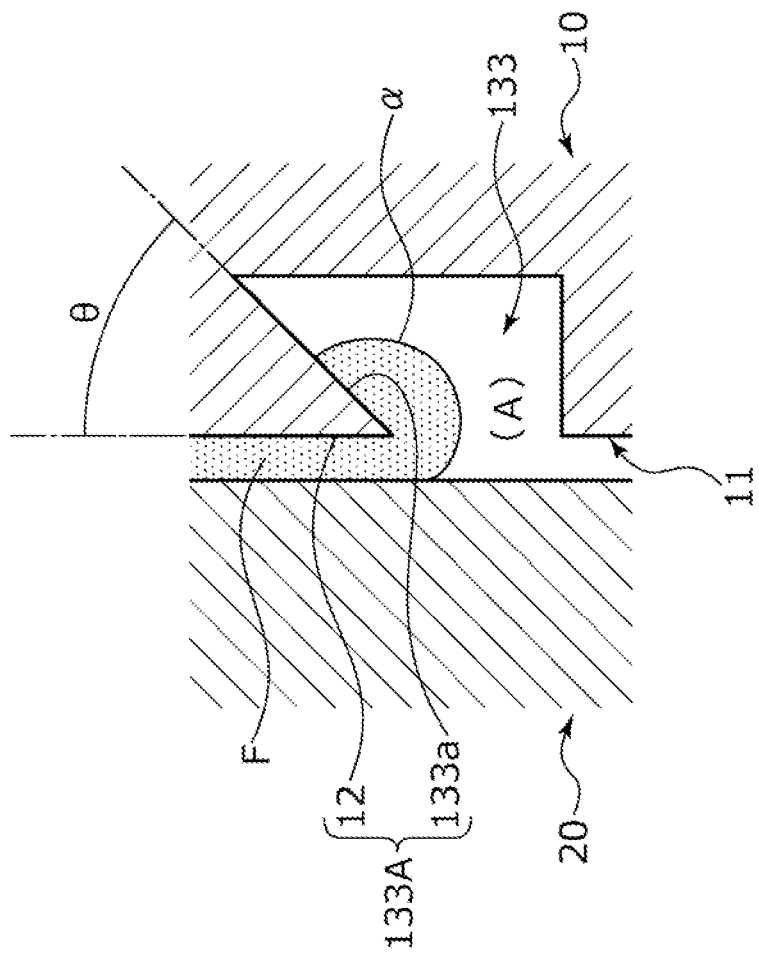
FIG. 11 is a cross-sectional view describing a groove of sliding components according to a fifth embodiment of the present invention.

As illustrated in FIG. 11, a wall portion 133A on an outer radial side, that is, a sealed liquid side of an annular groove 133 of this fifth embodiment is formed by the land 12 of the sliding surface 11 and an outer surface 133a of the annular groove 133 and an angle θ formed between the land 12 and the outer surface 133a is 45°. That is, since the wall portion 133A forms an acute angle, it is possible to reliably and largely ensure the surface area of the gas-liquid interface α of the sealed liquid F entering the annular groove 133. In addition, an angle θ formed between the land 12 and the outer surface 133a is not limited to 45° and can be freely changed. Preferably, the angle may be 90° or less.

Sixth Embodiment

Next, sliding components according to a sixth embodiment of the present invention will be described with reference to FIG. 12. In addition, a description for the overlapping configuration of the same configuration as that of the first embodiment will be omitted.

Figure 12:
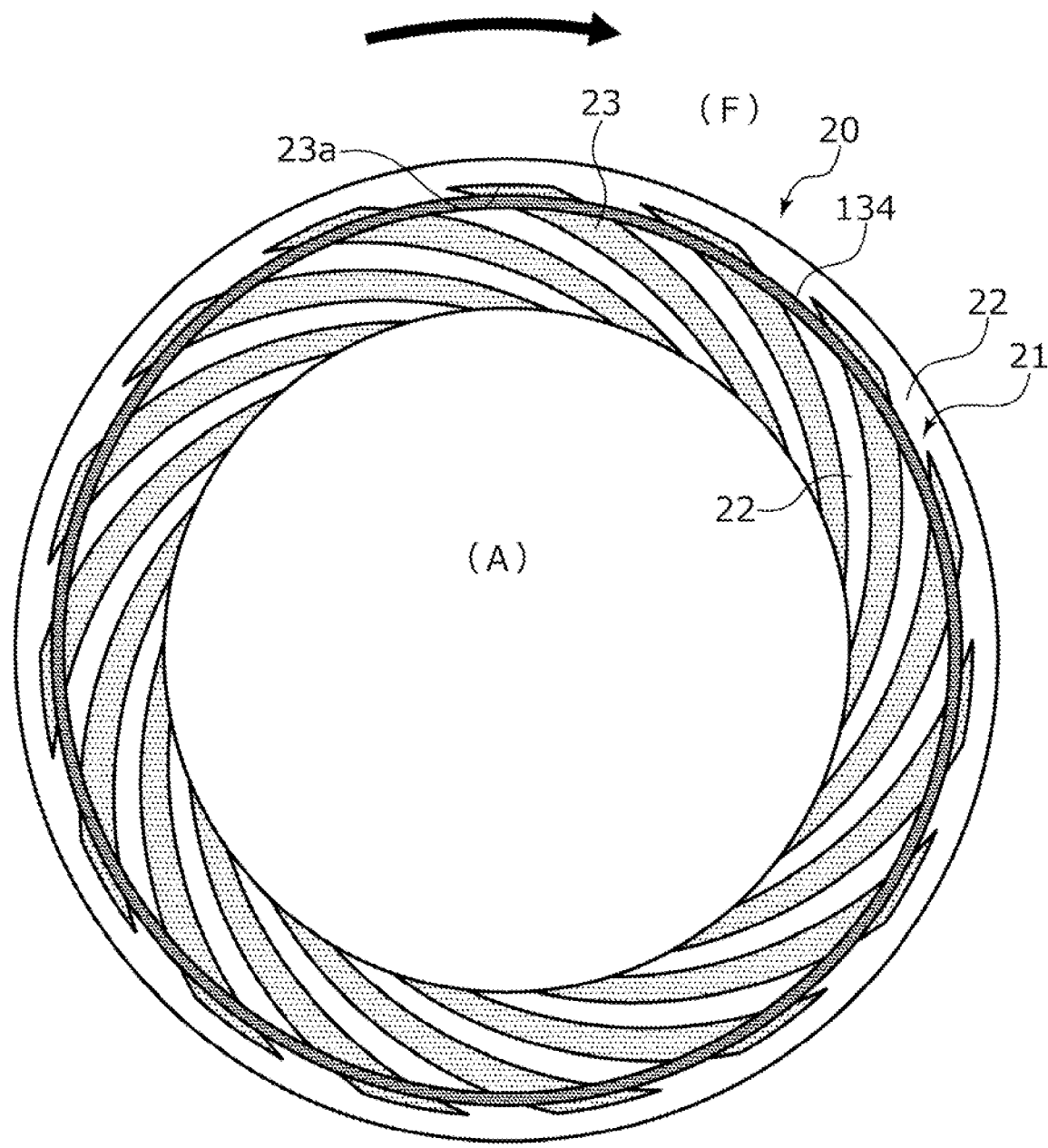
FIG. 12 is a view in which a rotating seal ring as one of sliding components according to a sixth embodiment of the present invention is viewed from a sliding surface side.

As illustrated in FIG. 12, an annular groove 134 of this sixth embodiment is formed on the sliding surface 21 of the rotating seal ring 20. That is, the sliding surface 21 of the rotating seal ring 20 is provided with the dynamic pressure generation groove 23 and the annular groove 134 and the dynamic pressure generation groove 23 and the annular groove 134 communicate with each other. Further, in this sixth embodiment, the sliding surface 11 (the land 12) of the stationary seal ring 10 is formed as a flat surface.

In this way, since the sliding surface 21 of the rotating seal ring 20 is provided with the dynamic pressure generation groove 23 and the annular groove 134, the positional relationship between the dynamic pressure generation groove 23 and the annular groove 134 during the relative rotation of the stationary seal ring 10 and the rotating seal ring 20 does not change and hence the dynamic pressure generated by the dynamic pressure generation groove 23 is stabilized. Further, in the sixth embodiment, a case has been described in which the sliding surface 11 of the stationary seal ring 10 is formed as a flat surface, but the stationary seal ring 10 may be provided with the same annular groove as that of the first embodiment. Furthermore, in the sixth embodiment, a case has been described in which the dynamic pressure generation groove 23 and the annular groove 134 are formed on the sliding surface 21 of the rotating seal ring 20, but the dynamic pressure generation groove and the annular groove may be formed on the sliding surface 11 of the stationary seal ring 10.

As described above, the embodiments of the present invention have been described with reference to the drawings, but the detailed configuration is not limited to these embodiments.

For example, in the above-described first to fifth embodiments of the present invention, a mechanical seal for general industrial machines has been described as the sliding components, but other mechanical seals for automobiles, water pumps, and the like may be used. Further, the present invention is not limited to the mechanical seal and sliding components other than a mechanical seal such as a slide bearing may be used.

Further, in the first to fifth embodiments, a case has been described in which the sliding component is provided with the plurality of dynamic pressure generation grooves having the same shape, but the plurality of dynamic pressure generation grooves may have different shapes or depths. Further, the interval or number of the dynamic pressure generation grooves may be appropriately changed.

Further, the dynamic pressure generation groove may be configured to correspond to both rotations of the rotating seal ring by having, for example, a T shape when viewed from the axial direction or a shape in which an L shape and an inverse L shape are mixed when viewed from the axial direction.

Further, the sealed liquid side has been described as the high-pressure side and the gas side corresponding to the leakage side has been described as the low-pressure side. However, the sealed liquid side may be the low-pressure side, the gas side may be the high-pressure side, and the sealed liquid side and the gas side may have substantially the same pressure.

REFERENCE SIGNS LIST

1 Rotation shaft
10 Stationary seal ring
11 Sliding surface
13 Annular groove (groove)
20 Rotating seal ring
21 Sliding surface
23 Dynamic pressure generation groove
23a Wall portion
131 Annular groove (groove)
132 Groove
133 Annular groove (groove)
134 Annular groove (groove)
231 Dynamic pressure generation groove

The invention claimed is:

1. A pair of sliding components configured for use in a relative rotating manner in a rotary machine between a sealed liquid side and a gas side, the pair of sliding components each having an annular shape with an inner radial side and an outer radial side thereof,
   wherein the pair of sliding components comprise a first sliding component and a second sliding component,
   the sliding surface of the first sliding component is provided with a dynamic pressure generation groove which communicates with a gas side in a radial direction and which is configured to generate a dynamic pressure between the sliding surfaces of the first and second sliding components by the gas during a running of the rotary machine,
   at least one of the sliding surfaces of the first and second sliding components is provided with a groove which extends in a circumferential direction,
   the groove is disposed on the gas side with respect to a closed end of the dynamic pressure generation groove,
   the groove is formed so as to coil up one or more times in the circumferential direction, and
   a bottom surface of the groove continuously extends in the circumferential direction over an entire radial.

2. The pair of sliding components according to claim 1, wherein the groove is provided in the sliding surface of the second sliding component.

3. The pair of sliding components according to claim 1, wherein the groove is formed to be deeper than the dynamic pressure generation groove.

4. The pair of sliding components according to claim 1, wherein the groove includes a wall portion in which an angle formed between a side surface partially defining the groove on a sealed liquid side and the sliding surface of the second sliding component is 90° or less.

5. The pair of sliding components according to claim 1, wherein the groove is formed in a spiral shape.

6. The pair of sliding components according to claim 2, wherein the groove is formed to be deeper than the dynamic pressure generation groove.

7. The pair of sliding components according to claim 2, wherein the groove includes a wall portion in which an angle formed between a side surface partially defining the groove on a sealed liquid side and the sliding surface of the second sliding component is 90° or less.

8. The pair of sliding components according to claim 3, wherein the groove includes a wall portion in which an angle formed between a side surface partially defining the groove on a sealed liquid side and the sliding surface of the second sliding component is 90° or less.

9. A pair of sliding components configured for use in a relative rotating manner in a rotary machine between a sealed liquid side and a gas side, the pair of sliding components each having an annular shape with an inner radial side and an outer radial side thereof,
   wherein the pair of sliding components comprise a first sliding component and a second sliding component,
   the sliding surface of the first sliding component is provided with a dynamic pressure generation groove which communicates with a gas side in a radial direction and which is configured to generate a dynamic pressure between the sliding surfaces of the first and second sliding components by the gas during a running of the rotary machine, at least one of the sliding surfaces of the first and second sliding components is provided with a groove which extends in a circumferential direction, the groove is disposed on the gas side with respect to a closed end of the dynamic pressure generation groove, the groove is a plurality of annular grooves provided in concentric circles, and a bottom surface of each of the annular grooves continuously extends in the circumferential direction over an entire radial.

10. The pair of sliding components according to claim 9, wherein the groove is provided in the sliding surface of the second sliding component.

11. The pair of sliding components according to claim 9, wherein the groove is formed to be deeper than the dynamic pressure generation groove.

12. The pair of sliding components according to claim 9, wherein the groove includes a wall portion in which an angle formed between a side surface partially defining the groove on a sealed liquid side and the sliding surface of the second sliding component is 90° or less.

* * * * *